United States Patent
Hirai et al.

(10) Patent No.: US 11,376,854 B2
(45) Date of Patent: Jul. 5, 2022

(54) PRINTING APPARATUS AND PRINTING SYSTEM

(71) Applicant: SEIKO EPSON CORPORATION, Tokyo (JP)

(72) Inventors: Yasuaki Hirai, Shiojiri (JP); Ryo Oguchi, Shiojiri (JP); Tokio Kato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 17/002,989

(22) Filed: Aug. 26, 2020

(65) Prior Publication Data

US 2021/0060953 A1 Mar. 4, 2021

(30) Foreign Application Priority Data

Aug. 29, 2019 (JP) .............................. JP2019-156430

(51) Int. Cl.
*B41J 2/165* (2006.01)
*B41J 2/045* (2006.01)
*G06F 3/12* (2006.01)

(52) U.S. Cl.
CPC ......... *B41J 2/1652* (2013.01); *B41J 2/04573* (2013.01); *B41J 2/04586* (2013.01); *G06F 3/1203* (2013.01); *G06F 3/1229* (2013.01); *B41J 2002/16573* (2013.01)

(58) Field of Classification Search
CPC .. B41J 2/1652; B41J 2/04573; B41J 2/04586; B41J 2002/16573; B41J 2/16523; B41J 2/16526; B41J 2/16508; G06F 3/1203; G06F 3/1229; G06F 3/1285
See application file for complete search history.

(56) References Cited

U.S. PATENT DOCUMENTS

| 5,565,898 A | 10/1996 | Sakuma |
| 2016/0279962 A1* | 9/2016 | Ishida ................... B41J 2/17566 |
| 2017/0348970 A1 | 12/2017 | Wakasa |

FOREIGN PATENT DOCUMENTS

| JP | JHP07-125225 A | 5/1995 |
| JP | 2001-138550 A | 5/2001 |
| JP | 2015-178179 A | 10/2015 |
| JP | 2017-217774 A | 12/2017 |

OTHER PUBLICATIONS

IP.com search (Year: 2022).*

* cited by examiner

*Primary Examiner* — Lisa Solomon
(74) *Attorney, Agent, or Firm* — Workman Nydegger

(57) ABSTRACT

A printing apparatus includes a setting section setting a reference value that satisfies an execution condition of a periodic maintenance; and a counting section counting a count value from a previous maintenance. A maintenance section performs the periodic maintenance when the count value of the counting section reaches the reference value. In a case where a user maintenance is performed by the maintenance section according to an instruction of a user, when the count value counted up to the user maintenance is a lower limit value or more, the setting section sets the reference value that is a value corresponding to the count value and is the lower limit value or more, while when the count value counted up to the user maintenance is less than the lower limit value, the setting section sets the lower limit value as the reference value.

11 Claims, 9 Drawing Sheets

FIG. 6

| USER | APPARATUS | APPARATUS TYPE | COMMUNICATION DESTINATION | INSTALLATION DESTINATION | SUBSCRIPTION | CONFIRMATION REQUEST INFORMATION | EXCHANGE REQUEST INFORMATION | REFERENCE VALUE | MAINTENANCE HISTORY | | |
|---|---|---|---|---|---|---|---|---|---|---|---|
| | | | | | | | | | TIME INFORMATION | TYPE | COUNT VALUE |
| USER A | APPARATUS A | APPARATUS TYPE A | COMMUNICATION DESTINATION A | INSTALLATION DESTINATION A | VALID | VALID | INVALID | REFERENCE VALUE A | TIME INFORMATION A1 | PERIODIC | COUNT VALUE A1 |
| | | | | | | | | | ... | ... | ... |
| | | | | | | | | | TIME INFORMATION A2 | PERIODIC | COUNT VALUE A2 |
| | | | | | | | | | TIME INFORMATION A3 | USER | COUNT VALUE A3 |
| USER B | APPARATUS B | APPARATUS TYPE B | COMMUNICATION DESTINATION B | INSTALLATION DESTINATION B | INVALID | VALID | VALID | REFERENCE VALUE B | TIME INFORMATION B1 | PERIODIC | COUNT VALUE B1 |
| | | | | | | | | | ... | ... | ... |
| | | | | | | | | | TIME INFORMATION B2 | USER | COUNT VALUE B2 |
| | | | | | | | | | TIME INFORMATION B3 | USER | COUNT VALUE B3 |
| ... | ... | ... | ... | ... | ... | ... | ... | ... | ... | ... | ... |

DB

PRINTING APPARATUS AND PRINTING SYSTEM

The present application is based on, and claims priority from JP Application Serial Number 2019-156430, filed Aug. 29, 2019, the disclosure of which is hereby incorporated by reference here in its entirety.

BACKGROUND

1. Technical Field

The present disclosure relates to a printing apparatus and a printing system provided with an ejecting section that ejects a liquid such as ink onto a medium such as paper.

2. Related Art

In the related art, as a type of printing apparatus, an ink jet type printing apparatus is known in which ink is supplied from an ink accommodation body such as an ink cartridge or an ink tank to an ink ejecting head, and the ink is ejected from the ink ejecting head onto paper to perform printing. In such a printing apparatus, maintenance of the ink ejecting head is performed by ejecting the ink from the ink ejecting head in order to remove thickened ink, bubbles in the ink, and the like in a nozzle that supplies the ink to the ink ejecting head.

In such a printing apparatus, for example, JP-A-7-125225 discloses an apparatus which is capable of changing stepwise maintenance timing according to an operation of a user, in which setting of timing of a periodic maintenance that is periodically performed can be continuously changed.

However, in such a printing apparatus, when the setting is changed so that the timing of the periodic maintenance is continuously quickened, the periodic maintenance is frequently performed. Accordingly, for example, when a state requiring maintenance is continued, an ink consumption amount is not wasted. However, when the periodic maintenance is performed even in a state where maintenance is performed and thereby the maintenance is unnecessary, if the periodic maintenance is frequently performed, the ink consumption amount for purposes other than printing may be unnecessarily increased.

SUMMARY

According to an aspect of the present disclosure, there is provided a printing apparatus including: an ejecting section ejecting a liquid onto a medium, a maintenance section that performs maintenance of the ejecting section by discharging the liquid from the ejecting section, periodically or according to an instruction of a user, a setting section setting a reference value that satisfies an execution condition of a periodic maintenance periodically performed by the maintenance section, and a counting section counting a count value from a previous maintenance toward the reference value that specifies an interval of the periodic maintenance. The maintenance section performs the periodic maintenance when the count value counted by the counting section reaches the reference value. When the user maintenance is performed by the maintenance section according to the instruction of the user, when the count value counted up to the user maintenance is a lower limit value or more, the setting section sets the reference value that is a value corresponding to the count value and is the lower limit value or more, while when the count value counted up to the user maintenance is less than the lower limit value, the setting section sets the lower limit value as the reference value.

According to another aspect of the present disclosure, there is provided a printing apparatus which is configured to communicate with a server apparatus, the printing apparatus includes: an ejecting section ejecting a liquid onto a medium, a maintenance section that performs maintenance of the ejecting section by discharging the liquid at least to the ejecting section, periodically or according to an instruction of a user, a setting section setting a reference value that satisfies an execution condition of a periodic maintenance periodically performed by the maintenance section, a counting section counting a count value from a previous maintenance toward the reference value that specifies an interval of the periodic maintenance, and an information transmission section that transmits, to the server apparatus, count information relating to the count value from the previous maintenance to a user maintenance, when the user maintenance is performed according to an instruction of the user. The maintenance section performs the periodic maintenance when the count value reaches the reference value, and the setting section sets the reference value based on reference information determined by the server apparatus based on the count information.

According to further another aspect of the present disclosure, there is provided a printing system comprises, a printing apparatus and a server apparatus configured to communicate with the printing apparatus via a network, in which the printing apparatus includes: an ejecting section ejecting a liquid onto a medium, a maintenance section that performs maintenance of the ejecting section by discharging the liquid at least to the ejecting section, periodically or according to an instruction of a user, a setting section setting a reference value that satisfies an execution condition of a periodic maintenance periodically performed by the maintenance section, a counting section counting a count value from a previous maintenance toward the reference value that specifies an interval of the periodic maintenance, and an information transmission section that transmits, to the server apparatus, count information relating to the count value counted up to a user maintenance, when the user maintenance is performed by the maintenance section according to an instruction of the user. The maintenance section performs periodic maintenance when the count value reaches the reference value set by the setting section. The server apparatus includes: a determination section that determines the reference value that is a value corresponding to the count value and a value that is a lower limit value or more, when the count value to the user maintenance is the lower limit value or more based on count information from the printing apparatus, while determines the lower limit value as the reference value when the count value to the user maintenance is less than the lower limit value, and a reference information transmission section that transmits, to the printing apparatus, reference information relating to the reference value determined by the determination section. The determination section determines the reference value based on the reference information from the server apparatus.

BRIEF DESCRIPTION OF THE DRAWINGS

FIG. 6 is a schematic diagram illustrating a user information database stored in a storage section of a server apparatus of the first embodiment.

DESCRIPTION OF EXEMPLARY EMBODIMENTS

First Embodiment

Hereinafter, a printing apparatus and a printing system according to a first embodiment will be described with reference to the drawings.

Figure 1:
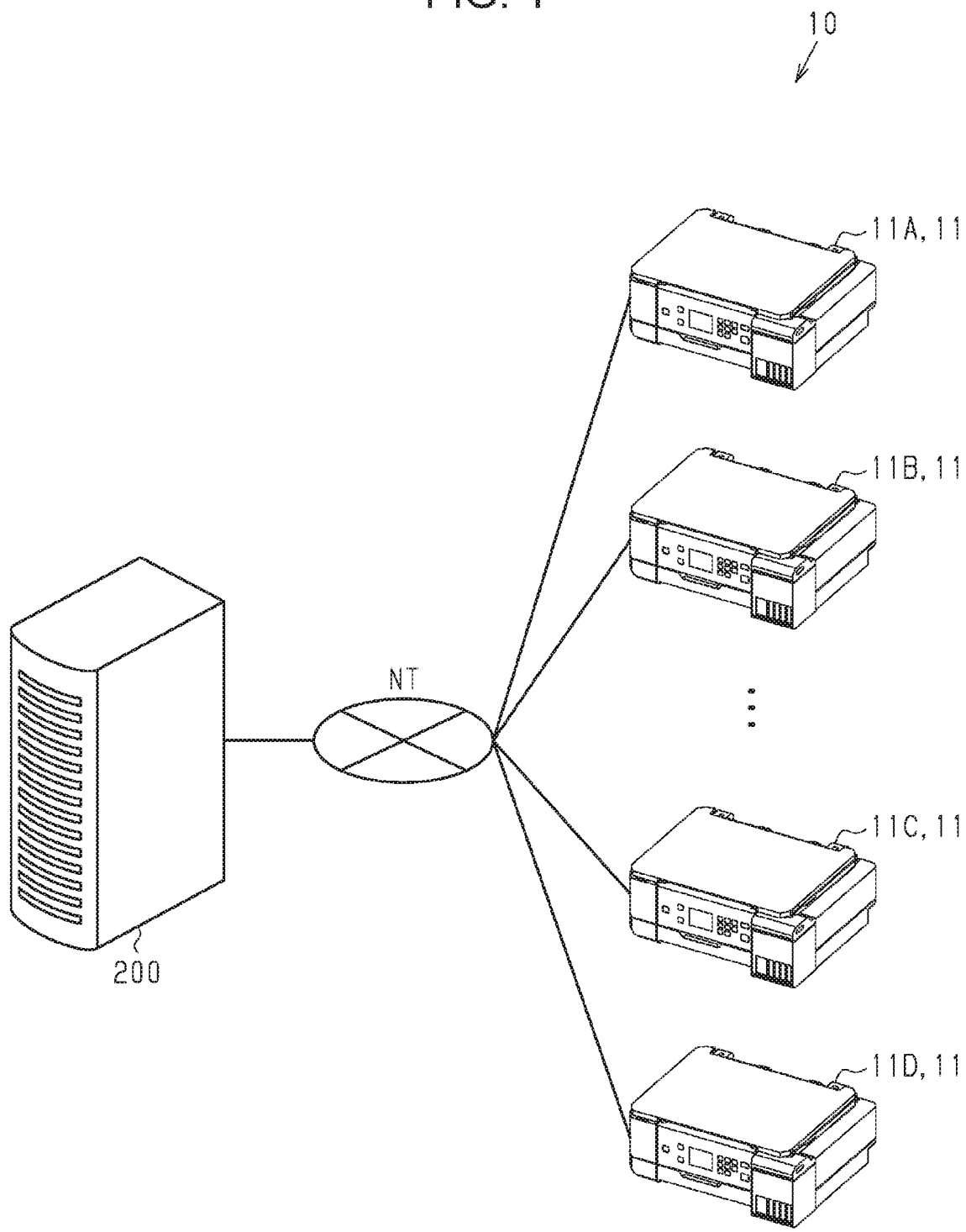
FIG. 1 is a schematic view illustrating a printing system according to a first embodiment.

As illustrated in FIG. 1, a printing system 10 includes a plurality of printing apparatuses 11 (printing apparatuses 11A to 11D in the drawing) that perform printing on a medium such as paper by ejecting a liquid such as ink onto the medium, and a server apparatus 200 that provides information to each of the plurality of printing apparatuses 11. The server apparatus 200 communicates with one or the plurality of printing apparatuses 11 via a network NT.

Figure 2:
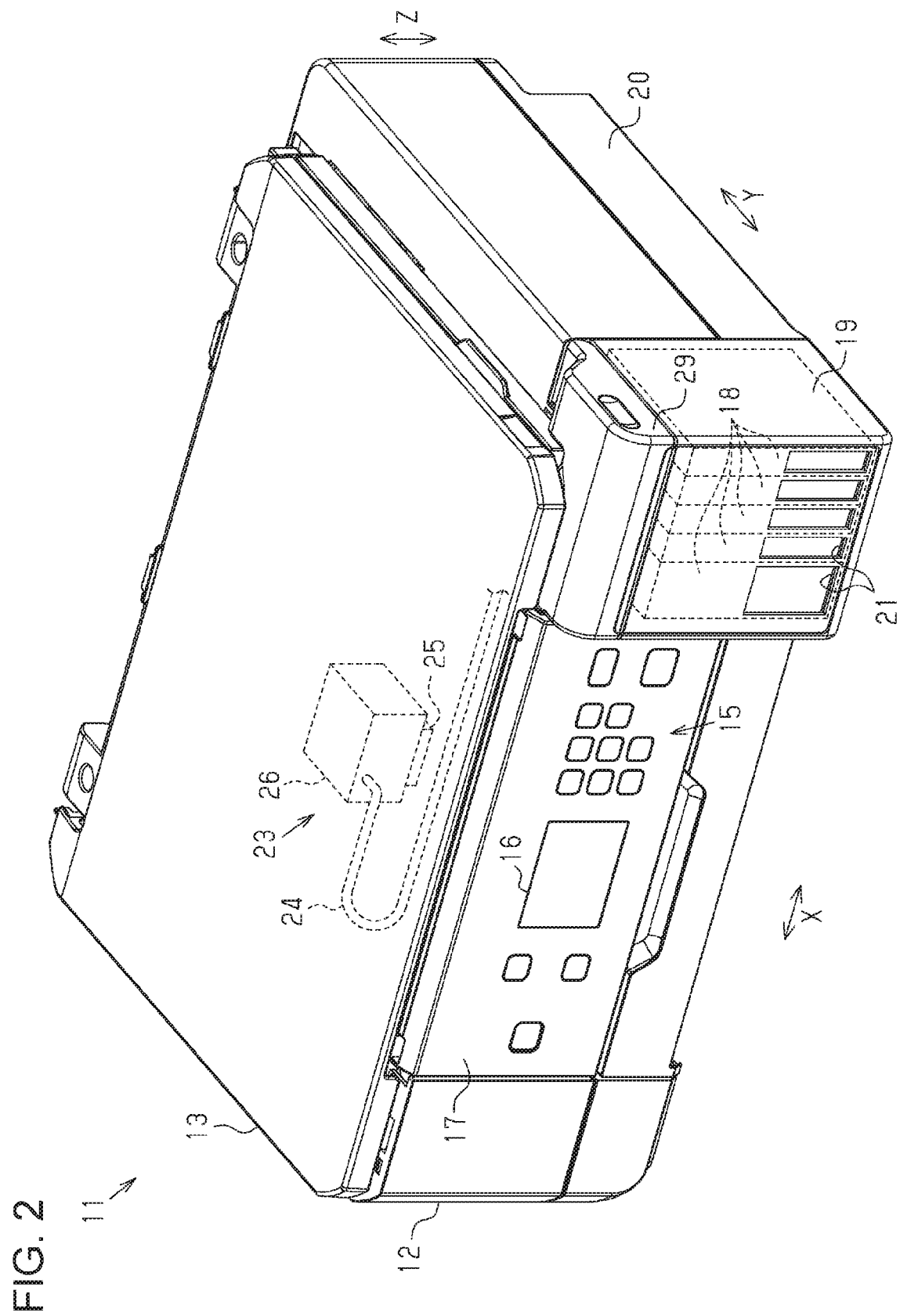
FIG. 2 is a perspective view illustrating a printing apparatus including a printing section according to the first embodiment.

As illustrated in FIG. 2, the printing apparatus 11 includes a printing section 12 that performs printing on the medium, and an image reading section 13 that is disposed in a state where an upper side of the printing section 12 is covered and reads an image of a document as image data. The printing apparatus 11 has a substantially rectangular parallelepiped shape as a whole.

In the present embodiment, a direction of gravity is referred to as a downward direction, and the opposite direction is referred to as an upward direction. Then, in FIG. 2, assuming that the printing apparatus 11 is placed on a horizontal plane, a direction along the direction of gravity is illustrated as a vertical direction Z, and directions along the horizontal plane are illustrated as a width direction X and a depth direction Y. That is, the width direction X, the depth direction Y, and the vertical direction Z intersect each other (preferably, orthogonally). Further, one end side in the depth direction Y may be referred to as a front side, and the other end side opposite to the one end side may be referred to as a back side.

On the front side of the printing apparatus 11, there are provided with an operation panel 17 having an operation section 15 such as buttons for performing various operations of the printing apparatus 11 and a display section 16 for displaying information or the like of the printing apparatus 11. Furthermore, an accommodation body unit 19 for accommodating at least one (five in the present embodiment) ink accommodation body 18 is provided at an end portion of the printing apparatus 11 adjacent to the operation panel 17. The ink accommodation body 18 is provided in a housing 20 of the printing apparatus 11, and in the housing 20, at least one (five in the present embodiment) window section 21 corresponding to each ink accommodation body 18 is formed. Respective ink accommodation bodies 18 accommodate different types of ink. Here, the types of ink include, for example, types of ink colors such as cyan, magenta, yellow, and black, and types of colorants such as pigments and dyes contained in the ink.

In the housing 20, there are provided with an ejecting section 23 for ejecting ink onto a medium (not illustrated) and a supply section 24 having a tube or the like for supplying the ink accommodated in the ink accommodation body 18 to the ejecting section 23. The ejecting section 23 includes an ink ejecting head 25 that ejects the ink from nozzles (not illustrated), and a carriage 26 that holds the ink ejecting head 25 and is capable of reciprocating in the width direction X (scanning direction). Then, the ejecting section 23 performs printing on the medium by ejecting the ink from the moving ink ejecting head 25 toward the medium.

As described above, the operation panel 17 is provided in the housing 20. The ink accommodation body 18, the supply section 24, the ink ejecting head 25 (hereinafter, also referred to as the "ejecting head 25"), the carriage 26, and the like are accommodated in the housing 20. The supply section 24 of the present embodiment is configured by bundling a plurality of tubes individually corresponding to the ink accommodation bodies 18 into one.

Figure 3:
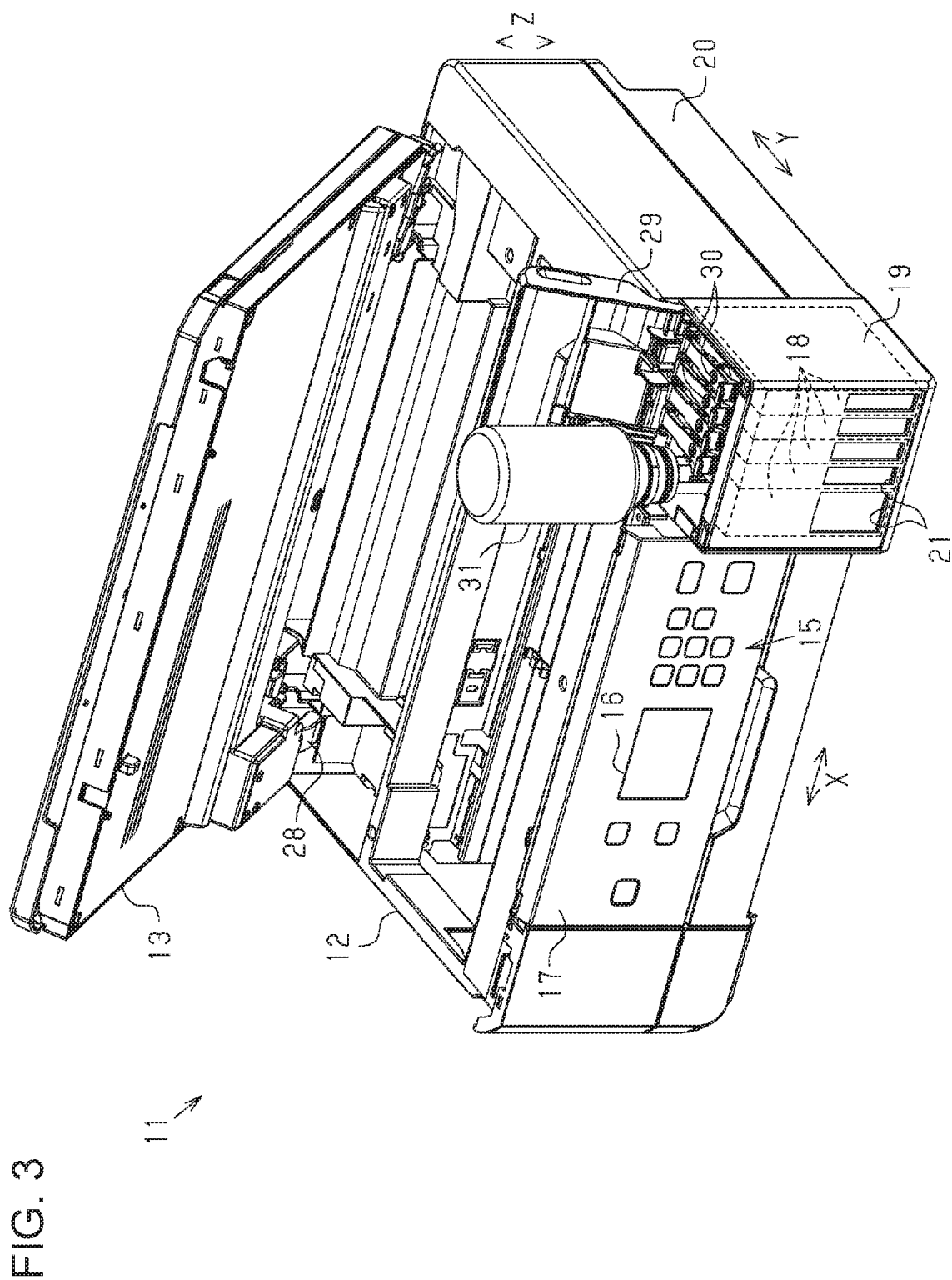
FIG. 3 is a perspective view of the printing apparatus illustrating a state in which ink is replenished to an ink accommodation body.

As illustrated in FIG. 3, the image reading section 13 is attached via a rotation mechanism 28 such as a hinge provided on the back side. The image reading section 13 can be opened and closed with respect to the printing section 12, and pivots between a closed position illustrated in FIG. 2 and an open position illustrated in FIG. 3. Then, when the image reading section 13 is located at the open position, a cover 29 of the accommodation body unit 19 and a lid 30 attached to the ink accommodation body 18 can be opened and closed. When the ink accommodation body 18 is replenished with the ink, as illustrated in FIG. 3, the image reading section 13, the cover 29, and the lid 30 are located at the open position, and an outlet of an ink bottle 31, which is an example of a liquid container filled with the ink for replenishment, is coupled to a pour of the ink accommodation body 18.

Next, a maintenance section 33 will be described in detail with reference to FIG. 4.

The maintenance section 33 is disposed below the ejecting head 25 when located at a home position illustrated in FIG. 4 where the carriage 26 stands by when the printing is not performed. The maintenance section 33 performs maintenance such as cleaning of the ejecting head 25.

Figure 4:
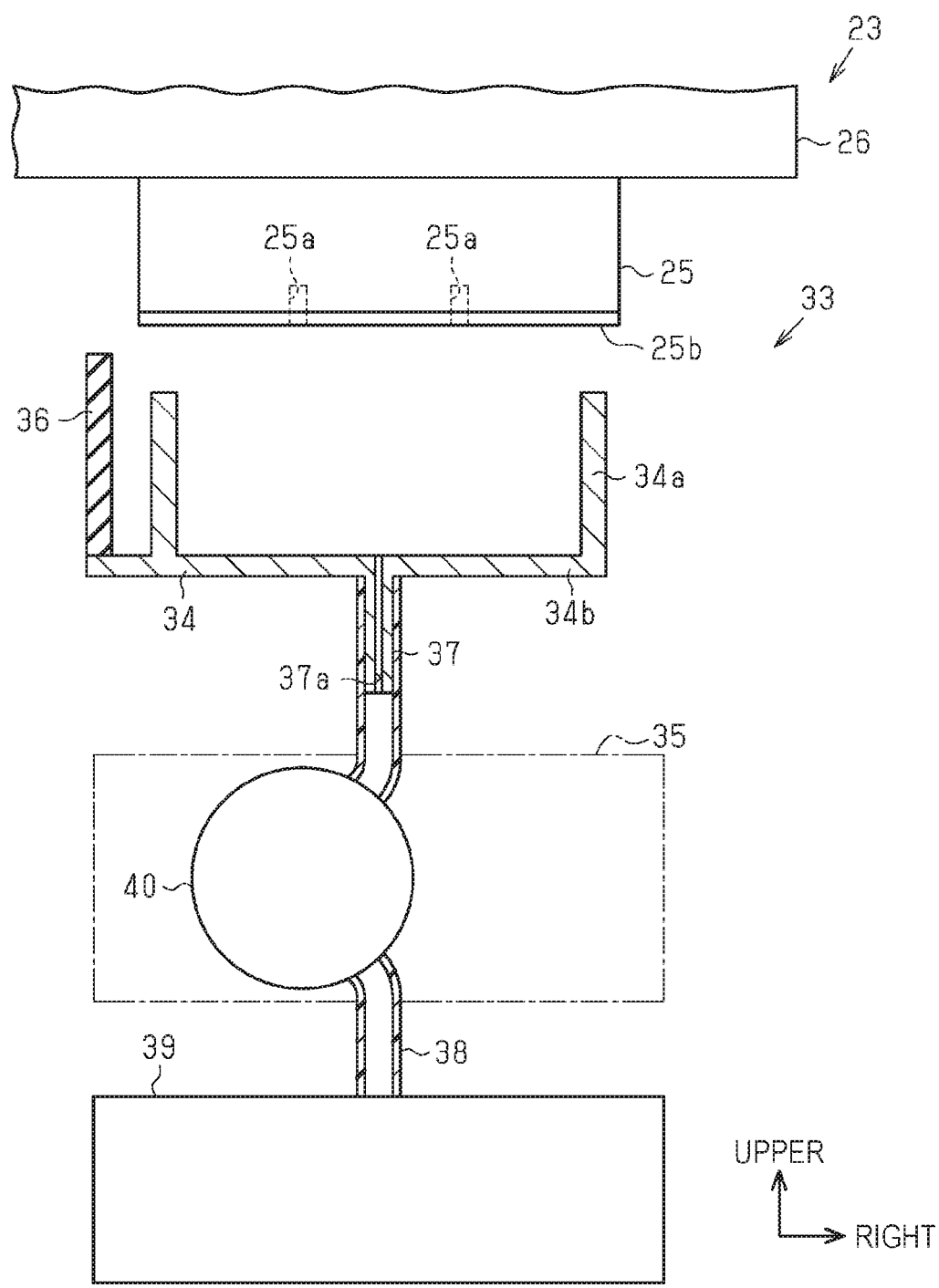
FIG. 4 is a partially exploded schematic view illustrating a maintenance section.

As illustrated in FIG. 4, the maintenance section 33 includes a cap 34 having a rectangular box shape with a bottom, a lifting apparatus 35 for lifting and lowering the cap 34, and a wiper 36 that moves up and down together with the cap 34. The wiper 36 is formed of an elastic member such as rubber extending upward to a position higher than a side wall 34a of the cap 34. The wiper 36 wipes a nozzle forming surface 25b by moving the carriage 26 from a position illustrated in FIG. 4 in the scanning direction in a state where the wiper 36 is raised to a wiping position higher than a retracted position illustrated in FIG. 4.

Further, one end portion of a flexible discharge tube 38 is coupled to a tubular protrusion section 37 protruding downward from a bottom wall 34b of the cap 34, while the other end portion of the discharge tube 38 is inserted into a rectangular parallelepiped waste liquid tank 39. An internal space of the cap 34 communicates with the waste liquid tank 39 through a discharge path 37a of the protrusion section 37 and the discharge tube 38. A maintenance pump 40 is provided at an intermediate portion of the discharge tube 38. The maintenance pump 40 is, for example, a tube pump.

The cap 34 is moved by the lifting apparatus 35 between the retracted position illustrated in FIG. 4 and a capping position which is raised from the retracted position and at which the cap 34 comes into contact with the nozzle forming surface 25b. When the maintenance pump 40 is driven in a state where the cap 34 is at the capping position, a closed space surrounded by the cap 34 and the nozzle forming surface 25b has a negative pressure. The ink is forcibly sucked and discharged from a nozzle 25a by the negative pressure, so that the ejecting head 25 is cleaned. The waste ink discharged into the cap 34 is discharged to the waste liquid tank 39 through the discharge tube 38. The ink accommodation body 18 serving as an ink supply source is of a pressurized supply type in which the ink is supplied by pressurization by a pressurizing pump. Cleaning may be pressurized cleaning performed to forcibly discharge the ink from the nozzle 25a of the ejecting head 25 by the pressurization by the pressurizing pump.

Further, during printing, the carriage 26 periodically moves to the home position, and performs preliminary ejection (so-called "flushing") in which ink irrelevant to the printing is ejected from the nozzles 25a of the ejecting head 25 toward the cap 34. Instead of the cap 34, an ejecting destination of the ink at the time of the preliminary ejection may be a waste liquid box dedicated to the preliminary ejection disposed at an end portion of the carriage 26 on a scanning path.

Figure 5:
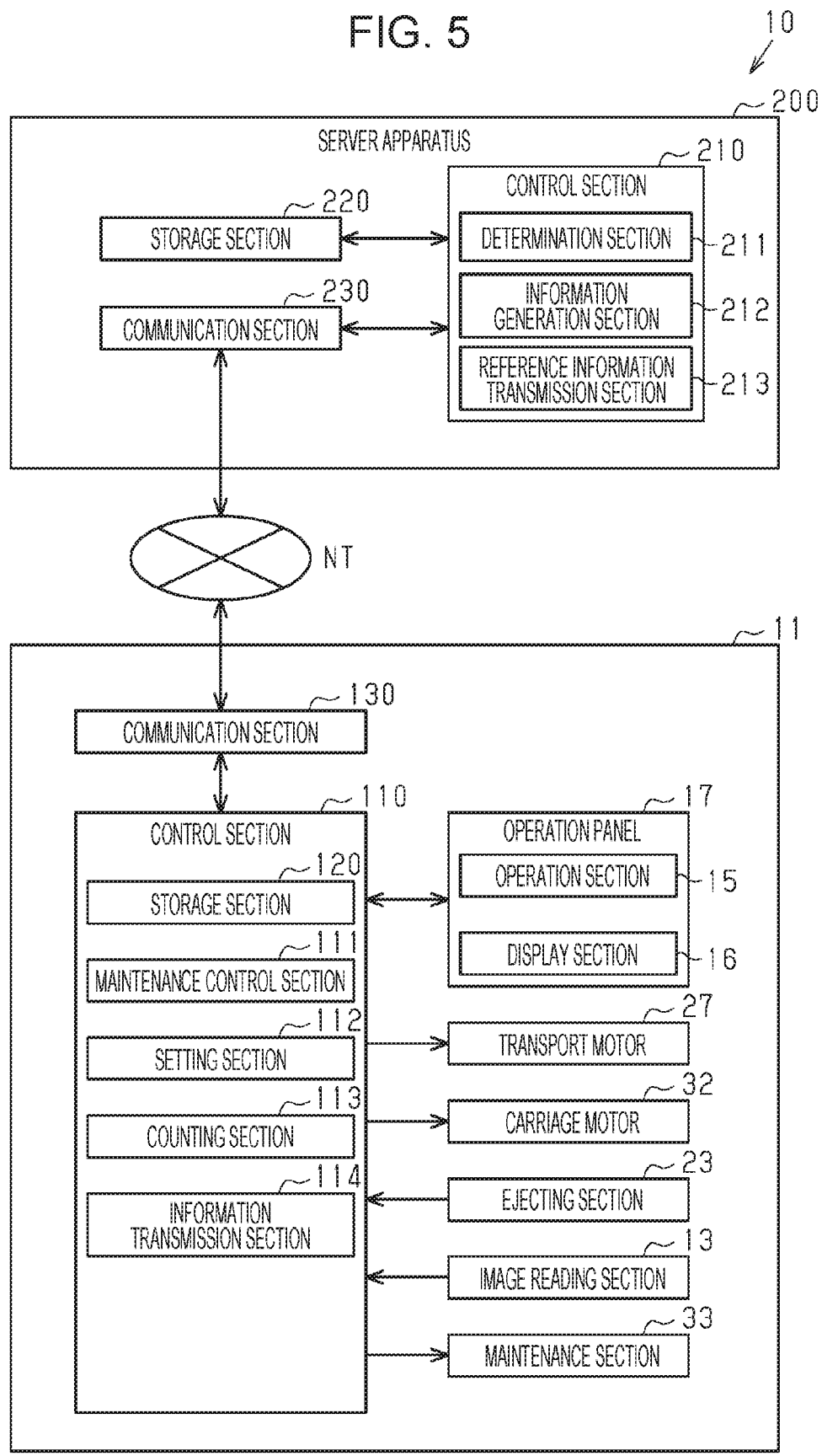
FIG. 5 is a block diagram illustrating an electrical configuration of the printing system according to the first embodiment.

Next, an electrical configuration of the printing system 10 will be described with reference to FIG. 5. Here, the printing system 10 in which one printing apparatus 11 communicates with the server apparatus 200 via the network NT will be described.

The printing apparatus 11 includes a control section 110. A communication section 130, the operation panel 17, a transport motor 27, a carriage motor 32, the ejecting section 23, the maintenance section 33, and the image reading section 13 are electrically coupled to the control section 110. The operation panel 17 includes the operation section 15 and the display section 16. If the display section 16 is a touch panel, the operation section 15 may be configured of an operation function portion of the touch panel.

The control section 110 includes a storage section 120 (memory) formed of a CPU, an application specific integrated circuit (ASIC), a RAM, a nonvolatile memory, and the like. The CPU performs various controls including the control of the printing apparatus 11 by executing control programs stored in the storage section 120. The storage section 120 stores the control programs that perform various controls in the printing apparatus 11 and reference data that is referred to in the control programs. Various pieces of information for controlling the printing apparatus 11 by the control section 110 are stored in the storage section 120. The communication section 130 communicates with the server apparatus 200 via the network NT.

Further, the control section 110 includes a maintenance control section 111, a setting section 112, a counting section 113, and an information transmission section 114 as functional sections that function by executing the control programs.

The maintenance control section 111 performs maintenance of the ejecting section 23. In the present embodiment, as the maintenance of the ejecting section 23, at least cleaning for forcibly discharging the ink from the nozzle 25a of the ejecting head 25 is performed. The maintenance control section 111 controls the maintenance section 33 to clean the ejecting section 23 by forcibly discharging the liquid from the ejecting section 23. By performing such cleaning, thickened ink, air bubbles, or foreign matters causing ejection failure is eliminated from the nozzles of the ejecting head 25.

Furthermore, as the maintenance of the ejecting section 23, preliminary ejection for ejecting the ink irrelevant to the printing from the nozzles 25a of the ejecting head 25 is also performed. The maintenance control section 111 controls the ejecting section 23 to cause the ejecting section 23 to perform the preliminary ejection. By performing such preliminary ejection, thickened ink or the like that causes an ejection failure is eliminated from the nozzle 25a of the ejecting head 25.

In the present embodiment, the maintenance includes a periodic maintenance that is performed periodically and a user maintenance that is performed according to an instruction of the user such as an operation of the operation section 15. As described above, the maintenance control section 111 performs the maintenance of the ejecting section 23 by controlling the maintenance section 33 periodically or according to the instruction of the user.

Particularly, the periodic maintenance is performed when a count value counted by the counting section 113 is a reference value that satisfies an execution condition. In the present embodiment, as described later in detail, the count value includes a count value relating to a time elapsed from a previous maintenance, and a count value relating to the number of printed sheets which is the number of media printed by ejecting the ink by the ejecting section 23 from the previous maintenance. The maintenance control section 111 performs the periodic maintenance when the count value counted from the previous maintenance is the reference value. Specifically, the maintenance control section 111 performs the periodic maintenance when the count value of the time elapsed from the previous maintenance is a time reference value that is the reference value relating to the time, or when the count value of the number of printed sheets counted from the previous maintenance is a sheet number reference value which is the reference value relating to the number of printed sheets. Further, when receiving the instruction of the user maintenance, the maintenance control section 111 performs the maintenance. In the present embodiment, when the user maintenance is performed, the reference value is changed according to the count value counted from the previous maintenance to the user maintenance. In the present example, when the user maintenance is performed, the time reference value is changed according to the count value of the time, and the sheet number reference value is changed according to the count value of the number of printed sheets.

The reason for performing the periodic maintenance every time the time count value reaches the time reference value is that the ink in the nozzle 25a of the ejecting section 23 may be thickened due to evaporation of moisture with the elapse of time or bubbles, which have grown to a size that causes nozzle failure, may be present in the ink in the ejecting section 23. Further, as the number of printed sheets increases, the foreign matter such as paper dust scattered from the medium may adhere to a vicinity of the nozzle 25a of the ejecting head 25, thereby causing the nozzle failure. The reason for performing the periodic maintenance every time the printed-sheet number count value reaches the sheet number reference value is that the foreign matter such as paper dust is removed from the nozzle 25a and the nozzle forming surface 25b by performing early cleaning before causing the nozzle failure. Further, a large number of printed sheets means that the printing operation time in which the ejecting section 23 is not capped by the cap 34 is long, and there is a high possibility that thickening of the ink is progressed in and around the nozzle 25a. Therefore, it is necessary for also removing the thickened ink in the nozzle 25a by performing early cleaning before causing the nozzle failure.

Further, when the user maintenance is performed, the maintenance control section 111 may change a maintenance intensity according to the count value counted from the previous maintenance to the user maintenance. When the user maintenance is performed, the maintenance control section 111 may increase the maintenance intensity indicating a level of maintenance greater when the count value counted from the previous maintenance to the user maintenance is a second count value, which is smaller than a first count value, than when the count value is the first count value. Here, the maintenance indicates the cleaning for forcibly discharging the ink from the nozzle of the ejecting head 25 to the maintenance section 33. In this case, the maintenance intensity indicates the cleaning intensity. The cleaning intensity increases as one or both of a flow rate when the ink is discharged and a cleaning time, which is an operation time of discharging the ink, is increased. In other words, the cleaning intensity increases as one or both of a rotation speed of the maintenance pump 40 driven at the time of the cleaning and a driving time of the maintenance pump 40 increases.

According to the control described above by the maintenance control section 111, the maintenance control section 111 may increase the ejection amount at the time of the preliminary ejection according to the count value counted from the previous maintenance to the user maintenance, when the user maintenance is performed. In this case, the preliminary ejection may be one or both of the preliminary ejection accompanying the cleaning and the preliminary ejection performed during the printing. That is, when the maintenance control section 111 performs the user maintenance, the ejecting section 23 ejects the ink with a larger ejection amount at the time of the preliminary ejection when the count value counted from the previous maintenance to the user maintenance is the second count value which is smaller than the first count value, than when the count value is the first count value.

When the user maintenance is performed, the maintenance section 33 increases the maintenance intensity for discharging the liquid larger when the count value counted by the counting section 113 from the previous maintenance to the user maintenance is the second count value, which is smaller than the first count value, than when the count value is the first count value. Further, when the user maintenance is performed, the maintenance section 33 ejects the liquid larger when the count value counted by the counting section 113 from the previous maintenance to the user maintenance is the second count value, which is smaller than the first count value, than the first count value. Here, the preliminary ejection includes a first preliminary ejection performed to adjust a meniscus of the ink in the nozzle 25a immediately after the cleaning ends, and a second preliminary ejection performed periodically during the printing. In the present embodiment, in both the first preliminary ejection and the second preliminary ejection, the liquid is ejected more in the second count value, which is smaller than the first count value, than in the first count value. For example, only in the first preliminary ejection of the first preliminary ejection and the second preliminary ejection, the liquid may be ejected more in the second count value than in the first count value. Only in the second preliminary ejection, the liquid may be ejected more in the second count value than in the first count value.

When the user maintenance is performed, the setting section 112 stores the reference value in the storage section 120 based on the reference value information from the server apparatus 200, thereby setting the reference value that satisfies the execution condition of the periodic maintenance. Particularly, as described later in detail, when the user maintenance is performed, the setting section 112 sets the count value as the reference value based on the reference value information from the server apparatus 200 when the count value counted from the previous maintenance to the user maintenance is a lower limit value or more. Meanwhile, the setting section 112 sets the lower limit value as the reference value, when the count value is less than the lower limit value. The reference value information corresponds to an example of the reference information.

The counting section 113 counts the count value from the previous maintenance. In the present example, the counting section 113 counts the count value relating to an interval from the previous maintenance to the next maintenance. The interval includes a time, the number of printed sheets, the number of passes, and the like. The count value relating to the interval, which is counted by the counting section 113, includes a count value relating to the time, a count value relating to the number of printed sheets, a count value relating to the number of passes, and the like. Particularly, the counting section 113 updates a time counter assigned to the storage section 120 to count the count value relating to the time elapsed from the previous maintenance. Further, the counting section 113 updates a printed-sheet number counter assigned to the storage section 120 to count the count value relating to the number of printed sheets from the previous maintenance. When the printing apparatus 11 is a serial printer that performs the printing by ejecting the ink toward the medium while moving the ejecting section 23 in the scanning direction, the counting section 113 updates a pass number counter assigned to the storage section 120 to count the count value relating to the number of passes from the previous maintenance. Here, one scan in which the ejecting section 23 moves while ejecting the liquid is called a pass, and the pass number counter counts the number of passes from the previous maintenance as the count value. The counting section 113 may be configured of a counter included in an electronic circuit such as the ASIC.

When the maintenance is performed, the information transmission section 114 transmits the maintenance information as an example of the count information to the server apparatus 200. The maintenance information includes maintenance type information capable of identifying whether the maintenance is the user maintenance or the periodic maintenance, and count value information capable of identifying the count value counted by the counting section 113. When the user maintenance is performed, the information transmission section 114 transmits, to the server apparatus 200, the maintenance information relating to a numerical value counted from the previous maintenance to the user maintenance. Further, when the user maintenance is performed, when a difference between the count value at the time of the previous maintenance and the count value counted from the previous maintenance to the user maintenance by the counting section 113 is a first specified value or more, the information transmission section 114 transmits, to the server apparatus 200, the maintenance information indicating that the difference is the first specified value or more. Further, when the user maintenance is performed, when the difference between the count value at the time of the previous maintenance and the count value counted from the previous maintenance to the user maintenance by the counting section 113 is a second specified value or more, the information transmission section 114 transmits, to the server apparatus 200, the maintenance information indicating that the difference is the second specified value or more.

The specified value is set to a value in which the difference between the count value at the time of the previous maintenance and the count value counted from the previous maintenance to the user maintenance by the counting section 113 is larger than a difference assumed when the ejecting section 23 is normal. Here, in a use period from a start of use to an expected life, the performance of the ejecting section 23 gradually deteriorates even if the ejecting section 23 is normal. An interval from the previous cleaning until the user maintenance is required due to an occurrence of the nozzle failure is gradually shorter along a predetermined deterioration speed profile as a total use time is longer. Accordingly, when the ejecting section 23 deteriorates at a normal speed, it is possible to estimate the interval until the user maintenance is performed in the total use time of the printing apparatus 11 based on the predetermined deterioration speed profile. When the difference between the count value at the time of the previous maintenance and the count value counted from the previous maintenance to the user maintenance is the specified value or more which is larger than the difference set stepwise corresponding to the total use time of the ejecting section 23, it is possible to estimate that some abnormality including a failure or the like occurs in the ejecting section 23.

When the interval until the user maintenance is too earlier than expected due to this type of abnormality, the difference between the count value at the time of the previous maintenance and the count value from the previous maintenance to the user maintenance is the specified value or more corresponding to the total use time at that time, among a plurality of specified values set stepwise in association with the total use time. The storage section 120 stores a plurality of specified values set stepwise in association with the total use time. Here, the interval is specified by the time, the number of printed sheets, the number of passes, and the like, which are used as parameters for determining the maintenance interval. A plurality of specified values are set so that the values increase stepwise as the total use time of the printing apparatus 11 increases.

If the interval is the time, when the ejecting section 23 is abnormal, the difference between the value of the time counter at the time of the previous maintenance and the value of the time counter at the time of instructing the user maintenance is larger than the time specified value which is the specified value of the difference in the time corresponding to the total use time at that time. If the interval is the number of printed sheets, when the ejecting section 23 is abnormal, the difference between the value of the printed-sheet number counter at the time of the previous maintenance and the value of the printed-sheet number counter at the time of instructing the user maintenance is larger than a sheet number specified value, which is the specified value of the difference in the number of printed sheets corresponding to the total use time at that time. Further, if the interval is the number of passes, when the ejecting section 23 is abnormal, the difference between the value of the pass number counter at the time of the previous maintenance and the value of the pass number counter at the time of instructing the user maintenance is shorter than a pass number specified value, which is the specified value of the difference in the number of passes corresponding the total use time. In the present embodiment, as the specified values used to determine the abnormality of the ejecting section 23, the time and the number of printed sheets are employed among the time, the number of printed sheets, and the number of passes. At least one of these three values may be employed as the specified value. For example, only the time may be employed, only the number of printed sheets may be employed, or only the number of passes may be employed.

In the present embodiment, a plurality of specified values are set according to a failure level of the ejecting section 23. In the present example, a first specified value and a second specified value larger than the first specified value are set as the specified values in order to determine the failure level in two steps. As will be described later in detail, the first specified value is a value for determining a failure level at which maintenance work of the printing apparatus 11 by a service provider or the like is required, and the second specified value is a value for determining a failure level at which exchange of the printing apparatus 11 is required.

The transport motor 27 is a drive source that transports the medium according to a control signal from the control section 110. The carriage motor 32 is a drive source that drives the carriage 26 according to a control signal from the control section 110. When the printing apparatus 11 is a line printer, an electrical configuration thereof is the same as that of FIG. 5 excluding the carriage motor 32. The ejecting section 23 ejects the ink onto the medium according to a control signal from the control section 110. The image reading section 13 reads an image according to a control signal from the control section 110, and outputs read image data to the control section 110.

The server apparatus 200 includes a control section 210, a storage section 220, and a communication section 230. The control section 210 includes a CPU. The CPU performs various controls relating to the server apparatus 200 by executing control programs. The storage section 220 stores control programs that perform various controls in the server apparatus 200 and reference data that is referred to in the control programs. The communication section 230 communicates with another apparatus such as the printing apparatus 11 via the network NT.

The control section 210 includes a determination section 211, an information generation section 212, and a reference information transmission section 213 as functional sections that function by executing control programs.

When the user maintenance is performed in the printing apparatus 11 and the maintenance information is received from the printing apparatus 11, when the count value counted from the previous maintenance to the user maintenance is the lower limit value or more based on the maintenance information, the determination section 211 determines the count value as the reference value. Meanwhile, when the count value is less than the lower limit value, the determination section 211 determines the lower limit value as the reference value.

The information generation section 212 generates confirmation request information relating to confirmation of the printing apparatus 11 when receiving, from the printing apparatus 11, maintenance information indicating that the difference in the count value is the first specified value or more. Further, the information generation section 212 generates exchange request information relating to the exchange of the printing apparatus 11 when receiving, from the printing apparatus 11, maintenance information indicating that the difference in the count value is the second specified value or more. For example, in a case where the information generation section 212 includes at least two of the time count value, the printed-sheet number count value, and the pass number count value as the count values, if one of the differences in respective count values is the corresponding first specified value or more, the information generation section 212 determines that the difference in the count value is the first specified value or more, and generates the confirmation request information. Further, in a case where the information generation section 212 includes at least two of the time count value, the printed-sheet number count value, and the pass number count value as the count values, if one of the differences in respective count values is the corresponding second specified value or more, the information generation section 212 determines that the difference in the count value is the second specified value or more, and generates the exchange request information.

The reference information transmission section 213 transmits, to the printing apparatus 11, the reference value information relating to the reference value determined by the determination section 211.

In such a printing system 10, information relating to a plurality of printing apparatuses 11 configuring the printing system 10 is managed as a user information database in the server apparatus 200. Then, the server apparatus 200 performs information management relating to the periodic maintenance, such as a reference value for satisfying the execution condition of the periodic maintenance, according to the maintenance information from the printing apparatus 11.

In the present embodiment, the storage section 220 of the server apparatus 200 stores the user information database. The user information database is an information group for managing information relating to the maintenance.

As illustrated in FIG. 6, in a user information database DB, one or a plurality of pieces of apparatus identification information is associated with one piece of user identification information. The user identification information is identification information unique to the user, which can identify the user. The apparatus identification information is identification information unique to the printing apparatus 11, which can identify the printing apparatus 11.

In the user information database DB, one piece of apparatus identification information is associated with apparatus type information, apparatus communication information, installation destination information, subscription information, confirmation request information, exchange request information, and reference value information. The apparatus type information is information capable of identifying the type (model) of the printing apparatus 11. The apparatus communication information is information for communicating with the printing apparatus 11. The installation destination information is information indicating a location where the printing apparatus 11 is installed. The subscription information is information indicating whether the subscription is valid or invalid. The subscription is a system in which a fee for a period of using the printing system 10 or the number of printed sheets is generated irrespective of an ink consumption amount, and in the present embodiment, is an object to changeably control the reference value. The confirmation request information is information for requesting a maintenance service provider to confirm the printing apparatus 11. The exchange request information is information for requesting exchange of the printing apparatus 11 itself or parts of the printing apparatus 11. The reference value information is information indicating a value that satisfies the execution condition of the periodic maintenance in the printing apparatus 11, and in the present embodiment, there is a reference value for printed-sheet number data and a reference value for time count data.

In the user information database DB, one piece of apparatus identification information is associated with one or a plurality of pieces of maintenance history information. The maintenance history information includes time information, maintenance type information, and count value information. The time information is information indicating the time at which the maintenance history information is registered. The maintenance type information is information capable of identifying the type of maintenance performed in the printing apparatus 11, and includes the periodic maintenance and the user maintenance. The count value information is information indicating the count value when the maintenance is performed. In the present embodiment, the count value information includes a count value of the printed-sheet number data and a count value of the time count data.

In the server apparatus 200, user registration is performed before using the printing apparatus 11. In the user registration, in the user information database DB, the user identification information, the apparatus identification information, the apparatus type information, the apparatus communication information, the installation destination information, and the subscription information are associated with each other based on the information transmitted from the printing apparatus 11. In the user information database DB, invalidity is associated with the confirmation request information and the exchange request information as an initial value. In the user information database DB, the reference value is associated with an initial value corresponding to the type of the printing apparatus 11.

Here, various processes performed in the printing apparatus 11 and the server apparatus 200 according to various control programs will be described. First, a printing control process executed in the printing apparatus 11 will be described. The printing control process is executed by the control section 110 of the printing apparatus 11 when a printing instruction is issued according to an operation of the operation section 15.

In the printing apparatus 11, the control section 110 controls the transport motor 27, the carriage motor 32, and the ejecting section 23 based on image data included in the printing instruction when the printing instruction is issued by the user. Therefore, the printing process of performing the printing by ejecting the ink onto paper is executed.

Then, the control section 110 adds a value indicating the number of printed sheets of the printed medium to the printed-sheet number counters a result of the execution of the printing process, and ends the printing control process. The printed-sheet number counter is assigned to the storage section 120 and counts the number of printed sheets of the medium printed after the previous maintenance. Further, a value indicating the number of printed sheets based on a specified size (for example, A4 size) is set in the printed-sheet number counter. As described above, the control section 110 counts the number of printed sheets of the medium onto which the ink is ejected by the ejecting section 23 from the previous maintenance. Such a process is executed by the counting section 113 of the control section 110.

Further, in the time counting process different from the printing control process, in the printing apparatus 11, the control section 110 compares the time at which the previous maintenance stored in the storage section 120 is performed with a current time at every predetermined interval. Then, the time elapsed from the previous maintenance is set in a time counter, and the time counting process is ended. The time counter is assigned to the storage section 120, and counts the time elapsed since the previous maintenance is performed. The previous maintenance may be the periodic maintenance or the user maintenance. As described above, the control section 110 counts the time elapsed from the previous maintenance. Such a process is executed by the counting section 113 of the control section 110. When the printing apparatus 11 is used for the first time, the control section 110 stores a first use time in the storage section 120, compares the first use time with the current time, and sets the time elapsed from the first use time in the time counter.

Next, a maintenance control process executed in the printing apparatus 11 and a maintenance management process executed in the server apparatus 200 will be described. The maintenance control process is executed by the control section 110 of the printing apparatus 11 at every predetermined interval. The maintenance management process is executed by the control section 210 when the maintenance information is received from the printing apparatus 11.

Figure 7:
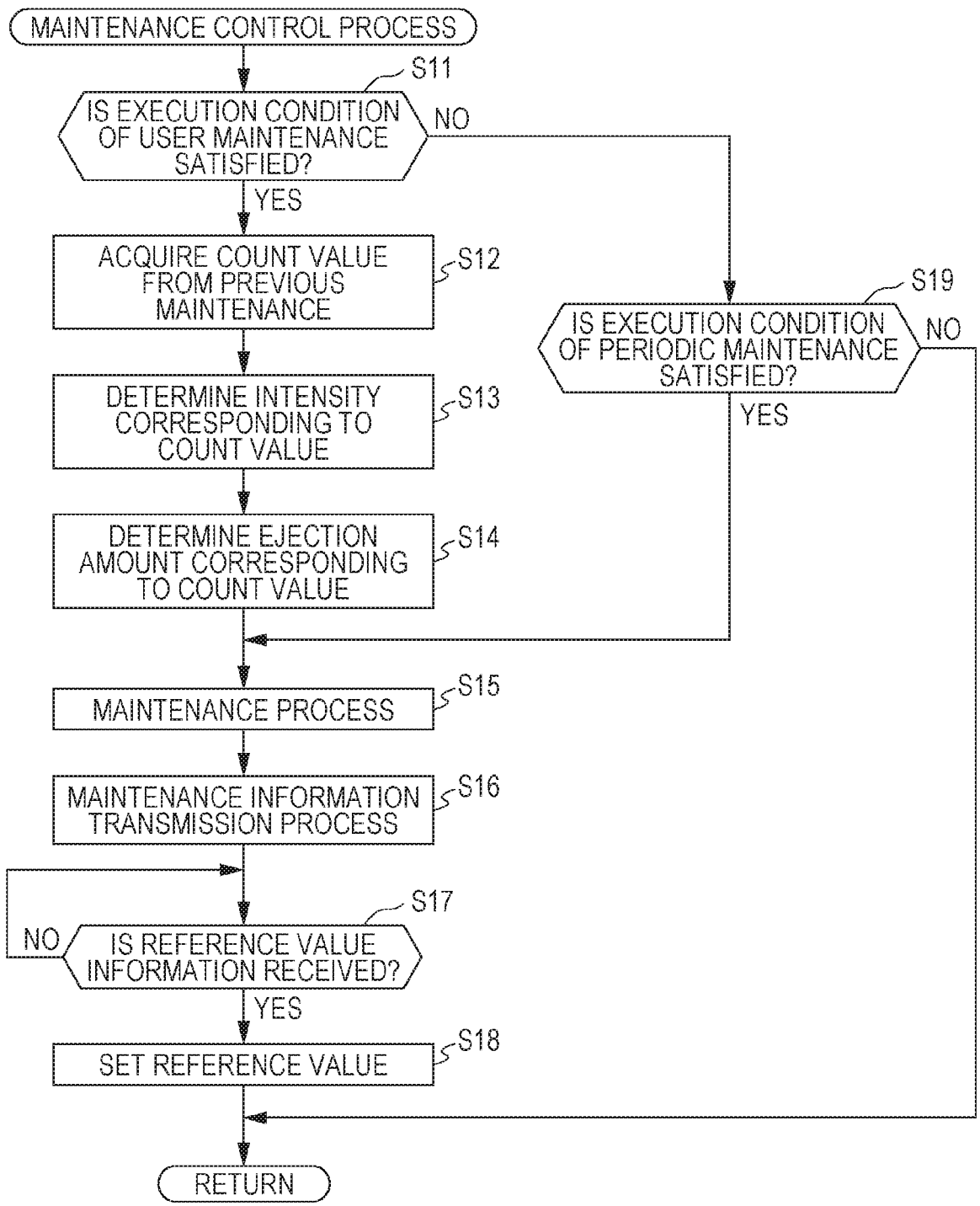
FIG. 7 is a flowchart illustrating a maintenance control process executed by a control section of the printing apparatus.

As illustrated in FIG. 7, in the printing apparatus 11, in step S11 of the maintenance control process, the control section 110 determines whether the execution condition of the user maintenance is satisfied. In this process, the control section 110 determines that the execution condition of the user maintenance is satisfied when a maintenance instruction is issued by the user according to an operation of the operation section 15. When it is determined that the execution condition of the user maintenance is not satisfied, the control section 110 proceeds to step S19. Meanwhile, when it is determined that the execution condition of the user maintenance is satisfied, the control section 110 proceeds to step S12.

In step S12, the control section 110 reads the value of the printed-sheet number counter and the value of the time counter assigned to the storage section 120, and acquires the count value from the previous maintenance.

Next, in step S13, the control section 110 determines a maintenance intensity corresponding to the count value. Specifically, the control section 110 determines a cleaning intensity corresponding to the count value. A plurality of steps of the cleaning intensity are prepared. A range from a lower limit value to an upper limit value of the count value is divided into a plurality of steps, and the control section 110 selects the cleaning intensity according to a step to which the read count value belongs. The control section 110 selects the cleaning with larger intensity in a step where the count value is smaller. In the present example, the range from the lower limit value to the upper limit value of the time count value, which is the count value of the time, is divided into a plurality of steps. The control section 110 selects the cleaning intensity, as a candidate, according to the step to which the read time count value belongs. Further, the range from the lower limit value to the upper limit value of the sheet number count value, which is the count value of the number of printed sheets, is divided into a plurality of steps. The control section 110 selects the cleaning intensity, as a candidate, according to the step to which the read sheet number count value belongs. The time count value which is a value of the time counter at the time of instructing the user maintenance, and the sheet number count value which is a value of the printed-sheet number counter, are obtained. The control section 110 acquires the cleaning intensity corresponding to the time count value and the cleaning intensity corresponding to the sheet number count value, and determines a larger one of these two cleaning intensities. The control section 110 may select a weaker one of the two cleaning intensities selected as the candidates. Further, when the user maintenance is instructed, one of the time count value and the sheet number count value may be employed, and the cleaning intensity corresponding to the one may be determined. For example, the time count value may be employed to determine the cleaning intensity corresponding to the time count value, or the number of printed sheets may be employed to determine the cleaning intensity corresponding to the sheet number count value.

Next, in step S14, the control section 110 executes an ejection amount increasing process of increasing the ejection amount of the ink ejected from the ejecting section 23 in the maintenance, and proceeds to step S15.

Meanwhile, in step S19, the control section 110 determines whether the execution condition of the periodic maintenance is satisfied. In this process, when the count value of the counting section 113 is the reference value or more, the control section 110 determines that the execution condition of the periodic maintenance is satisfied. The value of the printed-sheet number counter is read, and when the value of the printed-sheet number counter is a sheet number reference value or more, it is determined that the execution condition of the periodic maintenance is satisfied. Further, the control section 110 reads the value of the time counter, and determines that the execution condition of the periodic maintenance is satisfied when the value of the time counter is a time reference value or more. When the value of the printed-sheet number counter is a sheet number reference value or more, or when the value of the time counter is the time reference value or more, it is determined whether the execution condition of the periodic maintenance is satisfied. When it is determined that the execution condition of the periodic maintenance is not satisfied, the control section 110 ends the maintenance control process. Meanwhile, when it is determined that the execution condition of the periodic maintenance is satisfied, the control section 110 proceeds to step S15.

Next, in step S15, the control section 110 executes the maintenance process. In this process, the control section 110 performs at least the cleaning for discharging the ink from the nozzle 25*a* of the ejecting section 23. Further, the control section 110 initializes the printed-sheet number counter and the time counter assuming that the maintenance is performed. As described above, the control section 110 performs at least the cleaning for discharging the ink from the ejecting section 23 as the periodic maintenance or the user maintenance. In other words, the control section 110 performs the user maintenance according to an instruction of the user, and performs the periodic maintenance when the count value reaches the reference value.

Particularly, the control section 110 performs the cleaning in a previously determined cleaning intensity corresponding to the count value in the user maintenance. That is, when the user maintenance is performed, the control section 110 performs the cleaning in an intensity corresponding to the count value counted from the previous maintenance to the user maintenance.

For example, in the user maintenance, the cleaning is performed in an intensity corresponding to the value of the time counter. In this case, when the time count value which is the value of the time counter at the time of instructing the user maintenance is a first time count value, the cleaning is performed in the first intensity. When the time count value is the second time count value which is smaller than the first time count value, the cleaning is performed in the second intensity of which the intensity is larger than that of the first intensity. In other words, as the maintenance interval is shortened, the cleaning intensity increases stepwise. Further, in the case where the cleaning is performed at the intensity corresponding to the value of the printed-sheet number counter in the user maintenance, when the sheet number count value, which is the value of the printed-sheet number counter at the time of being instructed, is the first sheet number count value, the cleaning is performed in the first intensity. When the sheet number count value is the second sheet number count value which is smaller than the first sheet number count value, the cleaning is performed in the second intensity of which the intensity is larger than that of the first intensity. That is, as the number of printed sheets which are printed from the previous maintenance to the user maintenance decreases, the cleaning intensity increases stepwise.

In the periodic maintenance, the cleaning is performed in a previously determined constant intensity. This is because each time the user maintenance is performed, the count value at that time is set as the reference value, so that the cleaning interval is decreased stepwise, and thereby the ejection failure can be effectively suppressed. If the printing is being performed when the execution condition of the periodic maintenance is satisfied, the cleaning is performed after the printing is ended. Similarly to the case where the cleaning is performed at the intensity corresponding to the count value in the user maintenance, the cleaning may be performed at the intensity corresponding to the reference value in the periodic maintenance.

After the cleaning, the control section 110 starts the printing when receiving a printing instruction. The control section 110 periodically moves the carriage 26 to the home position during the printing, and performs preliminary ejection for ejecting the ink from the ejecting head 25 toward the cap 34 with an ejection amount corresponding to the count value determined in step S14. If the count value at the time of instructing the user maintenance is the first count value, the preliminary ejection is performed with a first ejection amount, and when the count value is the second count value which is smaller than the first count value, the preliminary ejection is performed with a second ejection amount of which an ejection amount is larger than that of the first ejection amount. At the time of the printing after the periodic maintenance, for example, the preliminary ejection may be performed with the ejection amount determined in step S14 at the time of the previous user maintenance. That is, it can be said that the ejection amount corresponding to the count value determined in step S14 is an ejection amount corresponding to the reference value. That is, in the printing after the periodic maintenance, the preliminary ejection is performed with the first ejection amount when the reference value is the first reference value at that time, and when the reference value is the second reference value which is less than the first reference value, the preliminary ejection is performed with the second ejection amount of which the ejection amount is larger than that of the first ejection amount. For example, as the maintenance interval is shortened, the ejection amount at the time of the preliminary ejection increases stepwise. Such a process is executed by the maintenance control section 111 of the control section 110.

Subsequently, in step S16, the control section 110 executes a maintenance information transmission process of transmitting maintenance information to the server apparatus 200 via the communication section 130 and the network NT. The maintenance information includes user identification information capable of identifying the user, apparatus identification information capable of identifying the printing apparatus, maintenance type information capable of identifying whether the maintenance is the periodic maintenance or the user maintenance, and count value information capable of identifying the count value. As described above, the control section 110 transmits the maintenance information to the server apparatus 200. Particularly, when the user maintenance is performed, the control section 110 transmits, to the server apparatus 200, the maintenance information relating to the count value counted from the previous maintenance to the user maintenance. Such a process is executed by the information transmission section 114 of the control section 110.

Figure 8:
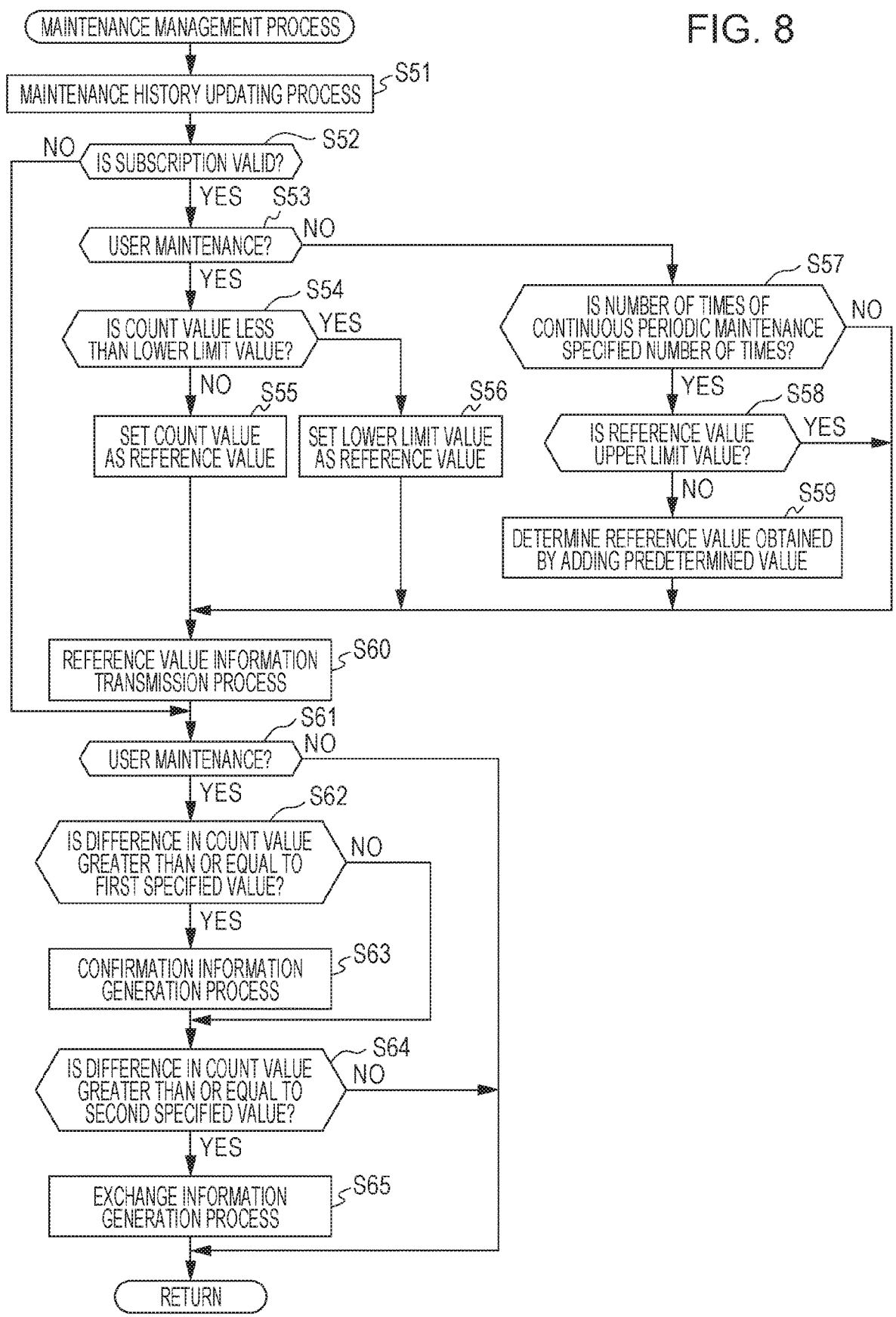
FIG. 8 is a flowchart illustrating a maintenance management process executed by a control section of the server apparatus.

As illustrated in FIG. 8, in the server apparatus 200, in step S51 of a maintenance management process, the control section 210 executes a maintenance history updating process of updating maintenance history information of the user information database DB based on the received maintenance information. In this process, the control section 210 registers, in the user information database DB, the time information when the maintenance information is received, the maintenance type information, and the count value information as the maintenance history information corresponding to the user identification information and the apparatus identification information included in the maintenance information.

Next, in step S52, the control section 210 refers to the user information database DB, reads the subscription information corresponding to the user identification information and the apparatus identification information included in the maintenance information, and determines whether or not the subscription information is valid. When it is not determined that the subscription information is valid, the control section 210 proceeds to step S61. Meanwhile, when it is determined that the subscription information is valid, the control section 210 proceeds to step S53.

In step S53, the control section 210 determines whether or not the maintenance is the user maintenance based on the maintenance type information included in the maintenance information. When it is determined that the maintenance is the user maintenance, the control section 210 proceeds to step S54. Meanwhile, when it is determined that the maintenance is not the user maintenance, that is, when it is determined that the maintenance is the periodic maintenance, the control section 210 proceeds to step S57.

In step S54, the control section 210 determines whether or not the count value included in the maintenance information is less than the lower limit value. Specifically, the control section 210 determines, based on the count value included in the maintenance information, that the count value is less than the lower limit value, when the value of the printed-sheet number counter is less than the sheet number lower limit value that is the lower limit value of the number of printed sheets, or when the value of the time counter is less than the time lower limit value that is the lower limit value of the time. Meanwhile, the control section 210 determines, based on the count value included in the maintenance information, that the count value is not less than the lower limit value, when the value of the printed-sheet number counter is the sheet number lower limit value or more and the value of the time counter is the time lower limit value or more. For the sheet number lower limit value and the time lower limit value, values corresponding to the apparatus type information are referred to.

When it is determined that the count value is not less than the lower limit value, the control section 210 determines the count value designated by the count value information included in the maintenance information as the reference value (step S55), and proceeds to step S60. Meanwhile, when it is determined that the count value is less than the lower limit value, the control section 210 determines the lower limit value as the reference value (step S56), and proceeds to step S60. As described above, based on the count value information included in the maintenance information from the printing apparatus 11, the control section 210 determines the count value counted from the previous maintenance to the user maintenance as the reference value, when the count value counted from the previous maintenance to the user maintenance is the lower limit value or more. Meanwhile, when the count value counted from the previous maintenance to the user maintenance is less than the lower limit value, the control section 210 determines the lower limit value as the reference value. Such a process is executed by the determination section 211 of the control section 210. When one of the value of the printed-sheet number counter and the value of the time counter is less than the lower limit value, and the other is the lower limit value or more, the control section 210 determines the lower limit value as the reference value corresponding to the counter in which the count value is less than the lower limit value, and determines the count value as the reference value corresponding to the counter in which the count value is the lower limit value or more.

Meanwhile, in step S57, the control section 210 determines whether the number of times of continuous periodic maintenance is the specified number of times. In the present embodiment, the specified number of times corresponds to a multiple of 5, but is not limited thereto. For example, the specified number of times may be a multiple of a natural number in the range of 1 to 4, a multiple of 6 or more, and may not be an integer multiple. The specified number of times may be one or more. When it is determined that the number of times of the continuous periodic maintenance is not the specified number of times, the process proceeds to step S60. Meanwhile, when it is determined that the number of times of the continuous periodic maintenance is the specified number of times, the control section 210 determines whether or not the reference value is the upper limit value (step S58). Specifically, when the value of the printed-sheet number counter is the sheet number upper limit value that is the upper limit value of the number of printed sheets, or when the value of the time counter is the time upper limit value that is the upper limit value of the time, the control section 210 determines that the count value is the upper limit value. Meanwhile, when the value of the printed-sheet number counter is less than the sheet number upper limit value and the value of the time counter is less than the time upper limit value, the control section 210 determines that the count value is not the upper limit value. For the sheet number upper limit value and the time upper limit value, values corresponding to the apparatus type information are referred to. When it is determined that the reference value is the upper limit value, the control section 210 proceeds to step S60. Meanwhile, when it is determined that the reference value is not the upper limit value, the control section 210 determines the reference value to which a predetermined value is added, and proceeds to step S60. The predetermined value is a value corresponding to the apparatus type information. For example, when the predetermined value for the number of sheets is added M times to the sheet number lower limit value, the predetermined value is a value that is the sheet number upper limit value, and when the predetermined value for the time is added N times to the time lower limit value, the predetermined value is a value that is the time upper limit value. Here, M and N are natural numbers, for example, in a range of 2 to 100. M and N may be a same value or different values. In the present embodiment, the upper limit value is set to a value larger than an initial value of the interval of the periodic maintenance, that is, the initial reference value which is the initial value of the reference value. The upper limit value may be a same value as the initial reference value.

Then, in step S60, the control section 210 executes a reference value information transmission process of transmitting reference value information capable of identifying the determined reference value to the printing apparatus 11 via the communication section 230 and the network NT. As described above, the control section 210 transmits the reference value information relating to the determined reference value to the printing apparatus 11. Such a process is executed by the reference information transmission section 213 of the control section 210.

Next, in step S61, the control section 210 determines whether or not the maintenance is the user maintenance based on the maintenance type information included in the maintenance information. When it is determined that the maintenance is not the user maintenance, that is, when it is determined that the maintenance is the periodic maintenance, the control section 210 ends the maintenance management process. Meanwhile, when it is determined that the maintenance is the user maintenance, the control section 210 proceeds to step S62.

In step S62, the control section 210 determines whether or not a difference between the count value at the time of the previous maintenance and the count value from the previous maintenance to the user maintenance is the first specified value or more. Specifically, when the difference between the value of the printed-sheet number counter at the time of the previous maintenance and the value of the printed-sheet number counter from the previous maintenance to the user maintenance is the first sheet number specified value or more, or when the difference between the value of the time counter at the time of the previous maintenance and the value of the time counter from the previous maintenance to the user maintenance is the first time specified value or more, the control section 210 determines that the difference in the count value is the first specified value or more. Meanwhile, when the difference in the printed-sheet number counter is less than the first sheet number specified value and the difference in the time counter is less than the first time specified value, the control section 210 determines that the difference in the count value is the first specified value or more. For the first sheet number specified value and the first time specified value, values corresponding to the apparatus type information are referred to. When it is determined that the difference in the count value is not the first specified value or more, the control section 210 proceeds to step S64. Meanwhile, when it is determined that the difference in the count value is the first specified value or more, the control section 210 executes a confirmation request information generation process of generating confirmation request information by setting the confirmation request information corresponding to the user identification information and the apparatus identification information to be valid (step S63), and proceeds to step S64. This confirmation request information is information for requesting the maintenance service provider to confirm the printing apparatus 11. As described above, when receiving the maintenance information indicating that the difference in the count value is the first specified value or more, the control section 210 generates the confirmation request information relating to the confirmation of the printing apparatus 11. Such a process is executed by the information generation section 212 of the control section 210.

In step S64, the control section 210 determines whether or not the difference between the count value at the time of the previous maintenance and the count value from the previous maintenance to the user maintenance is the second specified value or more. Specifically, when the difference between the value of the printed-sheet number counter at the time of the previous maintenance and the value of the printed-sheet number counter from the previous maintenance to the user maintenance is the second sheet number specified value or more, or when the difference between the value of the time counter at the time of the previous maintenance and the value of the time counter from the previous maintenance to the user maintenance is the second time specified value or more, the control section 210 determines that the count value is the second specified value or more. Meanwhile, when the difference in the printed-sheet number counter is less than the second sheet number specified value and the difference in the time counter is less than the second time specified value, the control section 210 determines that the difference in the count value is not the second specified value or more. For the second sheet number specified value and the second time specified value, values corresponding to the apparatus type information are referred to. When it is determined that the difference in the count value is not the second specified value or more, the control section 210 ends the maintenance management process. Meanwhile, when it is determined that the difference in the count value is the second specified value or more, the control section 210 executes an exchange information generation process of generating the exchange request information by setting the exchange request information corresponding to the user identification information and the apparatus identification information to be valid (step S65), and ends the maintenance management process. The exchange request information is information for requesting the exchange of the printing apparatus 11 itself or parts of the printing apparatus 11. As described above, when receiving the maintenance information indicating that the difference in the count value is the second specified value or more, the control section 210 generates the exchange request information relating to the exchange of the printing apparatus 11. Such a process is executed by the information generation section 212 of the control section 210.

As illustrated in FIG. 7, in the printing apparatus 11, in step S17 of the maintenance control process, the control section 110 determines whether or not the reference value information capable of identifying the reference value is received from the server apparatus 200 via the network NT and the communication section 130. When it is determined that the reference value information is not received, the control section 110 proceeds to step S17 again and waits for the reference value information. When it is determined that the reference value information is received, the control section 110 sets the reference value in the storage section 120 (step S18), and ends the maintenance control process. As described above, when the user maintenance is performed, the control section 110 sets the reference value that satisfies the execution condition of the periodic maintenance which is periodically performed based on the reference value information from the server apparatus 200. Particularly, when the user maintenance is performed, the control section 110 sets the reference value based on the count value, based on the reference value information from the server apparatus 200, when the count value counted from the previous maintenance to the user maintenance is the lower limit value or more. Meanwhile, when the count value counted from the previous maintenance to the user maintenance is less than the lower limit value, the control section 110 sets the lower limit value as the reference value. Such a process is executed by the setting section 112 of the control section 110.

An operation of the printing system 10 will be described.

In the printing apparatus 11, the storage section 120 of the printing apparatus 11 stores an initial value corresponding to the type of the printing apparatus 11 as the reference value. Specifically, the storage section 120 of the printing apparatus 11 stores the initial value corresponding to the type of the printing apparatus 11 as the reference value of the printed-sheet number counter, and stores the initial value corresponding to the type of the printing apparatus 11 as the reference value of the time counter.

Then, If power of the printing apparatus 11 is turned on when the printing apparatus 11 is used for the first time, an initial value is set in the printed-sheet number counter, and the current time is stored in the storage section 120. In the printing apparatus 11, a value indicating the elapsed time is set in the time counter based on a comparison result between the time stored in the storage section 120 and the current time in a predetermined cycle, so that the elapsed time can be recognized. Further, when the printing instruction is issued in the printing apparatus 11, the printing is performed by ejecting the ink onto the medium based on image data included in the printing instruction. In this case, every time printing is performed, the printed-sheet number counter increases by "1". Accordingly, a result of counting the number of printed sheets can be recognized.

Subsequently, when the value of the time counter is the time reference value, the execution condition of the periodic maintenance is satisfied. Further, when the value of the printed-sheet number counter is the sheet number reference value, the execution condition of the periodic maintenance is satisfied. When the execution condition of the periodic maintenance is satisfied, the periodic maintenance is performed. Then, the maintenance information including the maintenance type information capable of identifying the type of maintenance and the count value information indicating the count value is transmitted from the printing apparatus 11 to the server apparatus 200. Further, when the execution condition of the periodic maintenance is satisfied, initial values are set in the printed-sheet number counter and the time counter.

In the server apparatus 200, the maintenance history information based on the maintenance information from the printing apparatus 11 is registered in the user information database DB. The reference value information is not updated when the user information database DB is referred to and the periodic maintenance of the specified number of times is not continuously performed.

Further, in the printing apparatus 11, when the value of the time counter is not the time reference value and the value of the printed-sheet number counter is not the sheet number reference value, if the execution condition of the user maintenance is satisfied according to the instruction of the user, the user maintenance is performed. In this case, the liquid is ejected more when the value of the time counter is the second count value which is smaller than the first count value, than when the value of the time counter is the first count value. Further, the liquid is ejected more when the value of the printed-sheet number counter is the second count value which is smaller than the first count value, than when the value of the printed-sheet number counter is the first count value. As described above, the liquid is ejected more when the count value from the previous maintenance to the user maintenance is the second count value which is smaller than the first count value, than when the count value is the first count value. Increasing the ejection amount of the ink ejected from the ejecting section 23 makes it easier to remove thickened ink, air bubbles, or foreign matters that causes ejection failure from the nozzle 25a of the ejecting head 25. When the execution condition of the user maintenance is satisfied, the maintenance information including the maintenance type information capable of identifying the type of the maintenance and the count value information indicating the count value is transmitted from the printing apparatus 11 to the server apparatus 200. When the execution condition of the user maintenance is satisfied, the initial values are set in the printed-sheet number counter and the time counter.

In the server apparatus 200, the maintenance history information based on the maintenance information from the printing apparatus 11 is registered in the user information database DB. Based on the maintenance information, when the count value is the lower limit value or more, the reference value information is updated so that the count value is the reference value, while when the count value is less than the lower limit value, the reference value information is updated so that the lower limit value is the reference value. Then, the updated reference value information is transmitted to the printing apparatus 11.

In the printing apparatus 11, the reference value is updated based on the reference value information from the server apparatus 200. Accordingly, in a case where the user maintenance is performed, when the count value from the previous maintenance to the user maintenance is the lower limit value or more, the count value is set as the reference value. Meanwhile, when the count value from the previous maintenance to the user maintenance is less than the lower limit value, the count value is set as the lower limit value. Therefore, when the count value from the previous maintenance to the user maintenance is the lower limit value or more, it is estimated that maintenance is required. Therefore, the count value is the reference value that satisfies the execution condition of the periodic maintenance, and the interval at which the periodic maintenance is performed can be shortened. Meanwhile, even when the count value from the previous maintenance to the user maintenance is less than the lower limit value, the reference value that satisfies the execution condition of the periodic maintenance is not less than the lower limit value, and it is possible to suppress that the periodic maintenance is performed frequently.

Further, when the count value or the lower limit value is set as the reference value by performing the user maintenance, and then the value of the time counter is the time reference value, the execution condition of the periodic maintenance is satisfied, and the periodic maintenance is performed. Then, the maintenance information including the maintenance type information capable of identifying the type of maintenance and the count value information indicating the count value is transmitted from the printing apparatus 11 to the server apparatus 200. Further, when the execution condition of the periodic maintenance is satisfied, initial values are set in the printed-sheet number counter and the time counter.

In the server apparatus 200, the maintenance history information based on the maintenance information from the printing apparatus 11 is registered in the user information database DB. The reference value information is not updated when the user information database DB is referred to and the periodic maintenance of the specified number of times is not continuously performed. Meanwhile, when the specified number of times of the periodic maintenance is continuously performed, the reference value information is updated with a value obtained by adding a predetermined value to the reference value as a new reference value. Then, the updated reference value information is transmitted to the printing apparatus 11.

In the printing apparatus 11, the reference value is updated based on the reference value information from the server apparatus 200. Accordingly, when the specified number of times of the periodic maintenance is continuously performed, the predetermined value is added to the reference value. Therefore, when the user maintenance is performed, and then the periodic maintenance is continuously performed in a specified number of times, the predetermined value is added to the reference value, and the interval at which the periodic maintenance is performed can be lengthened, and it is possible to suppress that the periodic maintenance is frequently performed.

As described above in detail, according to the present embodiment, the following effects can be obtained.

(1) Periodically or according to an instruction of the user, the maintenance of the ejecting section 23 is performed by causing at least the ejecting section 23 to eject the liquid. The reference value that satisfies the execution condition of the periodic maintenance that is periodically performed is set, the count value is counted from the previous maintenance toward the reference value that specifies the interval of the periodic maintenance, and the periodic maintenance is performed when the count value which is counted reaches the reference value. Particularly, in the present example, the count value relating to the time elapsed from the previous maintenance, and the count value relating to the number of printed sheets, which is the number of media on which the ejecting section 23 ejects the ink from the previous maintenance, are counted. The periodic maintenance is performed when one of the count values reaches the corresponding reference value. When the user maintenance is performed according to the instruction of the user, the value corresponding to the count value counted from the previous maintenance to the user maintenance, and the value of the lower limit value or more can be set as the reference value. Meanwhile, even when the count value counted from the previous maintenance to the user maintenance is less than the lower limit value and the maintenance is frequently performed according to the instruction of the user, the lower limit value is set as the reference value. Therefore, it is possible to suppress that the consumption amount of the ink is excessively increased due to excessive ejection of the ink by frequently performing the periodic maintenance.

(2) Particularly, when the user maintenance is performed in the printing apparatus 11, the maintenance information relating to the count value counted from the previous maintenance to the user maintenance is transmitted to the server apparatus 200, and the reference value can be set based on the reference value information relating to the reference information from the server apparatus 200. Accordingly, with the communication with the server apparatus 200, it is possible to suppress that the consumption amount of the ink is excessively increased due to excessive ejection of the ink by frequently performing the periodic maintenance.

(3) When the user maintenance is performed, the preliminary ejection is performed with an ejection amount corresponding to the count value counted from the previous maintenance to the user maintenance. That is, when the preliminary ejection is performed, the control section 110 can eject ink more when the count value is the second count value which is smaller than the first count value, than when the count value is the first count value. Therefore, it is possible to suppress the frequency of the user maintenance is increased due to a shortage of the ejection amount of the ink at the time of the preliminary ejection.

(4) When the user maintenance is performed, the cleaning is performed with an intensity corresponding to the count value counted from the previous maintenance to the user maintenance. In a case where the user maintenance is performed, the ink can be discharged more when the count value counted from the previous maintenance to the user maintenance is the second count value which is smaller than the first count value, than when the count value is the first count value. Accordingly, it is possible to suppress that the frequency of the user maintenance increases due to an insufficient ink amount discharged in the cleaning at the time of the user maintenance. Therefore, the ejection failure can be more reliably eliminated.

(5) In a case where the user maintenance is performed, when the difference between the count value at the time of the previous maintenance and the count value counted from the previous maintenance to the user maintenance is the first specified value or more, in the server apparatus 200, the confirmation request information relating to the confirmation of the printing apparatus 11 is generated, so that the confirmation of the printing apparatus 11 can be recognized. Accordingly, it is possible to provide the user with a suitable service such as confirmation of the state of the printing apparatus 11 by the maintenance service provider.

(6) In a case where the user maintenance is performed, when the difference between the count value at the time of the previous maintenance and the count value counted from the previous maintenance to the user maintenance is the second specified value or more, the exchange of the printing apparatus 11 can be recognized by generating the exchange request information relating to the exchange of the printing apparatus 11. Accordingly, it is possible to provide the user with a suitable service such as the exchange of the printing apparatus 11 by the maintenance service provider.

(7) When the subscription is invalid, the reference value which is the interval of the periodic maintenance is held regardless of the count value at the time of instructing the user maintenance, and when the subscription is valid, the interval of the periodic maintenance is changed to be short by setting the count value as the reference value while the count value at the time of instructing the user maintenance is the lower limit value or more. Meanwhile, when the count value at the time of instructing the user maintenance is less than the lower limit value, the lower limit value is set as the reference value. Therefore, when the subscription is valid, the reference value is less than the lower limit value by shortening the interval of the periodic maintenance, even if the maintenance is frequently performed according to the instruction of the user. Therefore, it is possible to suppress that the consumption amount of the ink is excessively increased due to excessive ejection of the ink by frequently performing the periodic maintenance. Meanwhile, when the subscription is invalid, the interval of the periodic maintenance is not changed even after the user maintenance, so that it is possible to suppress that the consumption amount of the ink is excessively increased.

(8) Each time the number of continuous times that the periodic maintenance is continuously performed reaches the specified number of times, a new reference value obtained by adding a predetermined value to the reference value is set. In this case, until the reference value reaches the upper limit value, the reference value is increased by the predetermined value each time the number of continuous times of the periodic maintenance reaches the specified number of times. Even if the reference value, which is the interval of the periodic maintenance, is changed to be small by performing the user maintenance, thereafter, without performing the user maintenance, the interval of the periodic maintenance can be changed to be long by the predetermined value each time the number of continuous times of the periodic maintenance reaches the specified number of times. The upper limit value is set to a value larger than the initial value of the periodic maintenance. Accordingly, when the periodic maintenance is continuously performed without performing the user maintenance from the start of use of the printing apparatus 11, the reference value of the periodic maintenance is changed to a value longer than the initial value by changing the reference value to be long by the predetermined value each time the number of continuous times of the periodic maintenance reaches the specified number of times. Although there is an individual difference in the printing apparatus 11 in a probability of occurrence of the nozzle failure of the ejecting section 23, an appropriate interval of the periodic maintenance can be set according to the individual difference in the printing apparatus 11.

(9) The count value counted by the counting section 113 includes one of the elapsed time from the previous maintenance, the number of printed sheets that is the number of media on which the ejecting section 23 performs the process of ejecting the liquid from the previous maintenance, and the number of passes, which is the number of operations for ejecting the liquid onto the medium by the ejecting section 23 from the previous maintenance. The reference value that specifies the interval of the periodic maintenance is the time reference value when the count value is the elapsed time, the sheet number reference value when the count value is the number of printed sheets, and the pass number reference value when the count value is the number of passes. Therefore, the printing apparatus 11 can perform the periodic maintenance at appropriate timing.

Second Embodiment

Hereinafter, a second embodiment will be described. The printing apparatus 11 of the present embodiment has a function of determining the reference value, which the server apparatus 200 has in the first embodiment. In the second embodiment, a configuration different from the first embodiment will be mainly described, and a description of a configuration similar to that of the first embodiment will be omitted.

In the second embodiment, a maintenance control process executed by the printing apparatus 11 will be described. The maintenance control process is executed by the control section 110 of the printing apparatus 11 at every predetermined interval.

Figure 9:
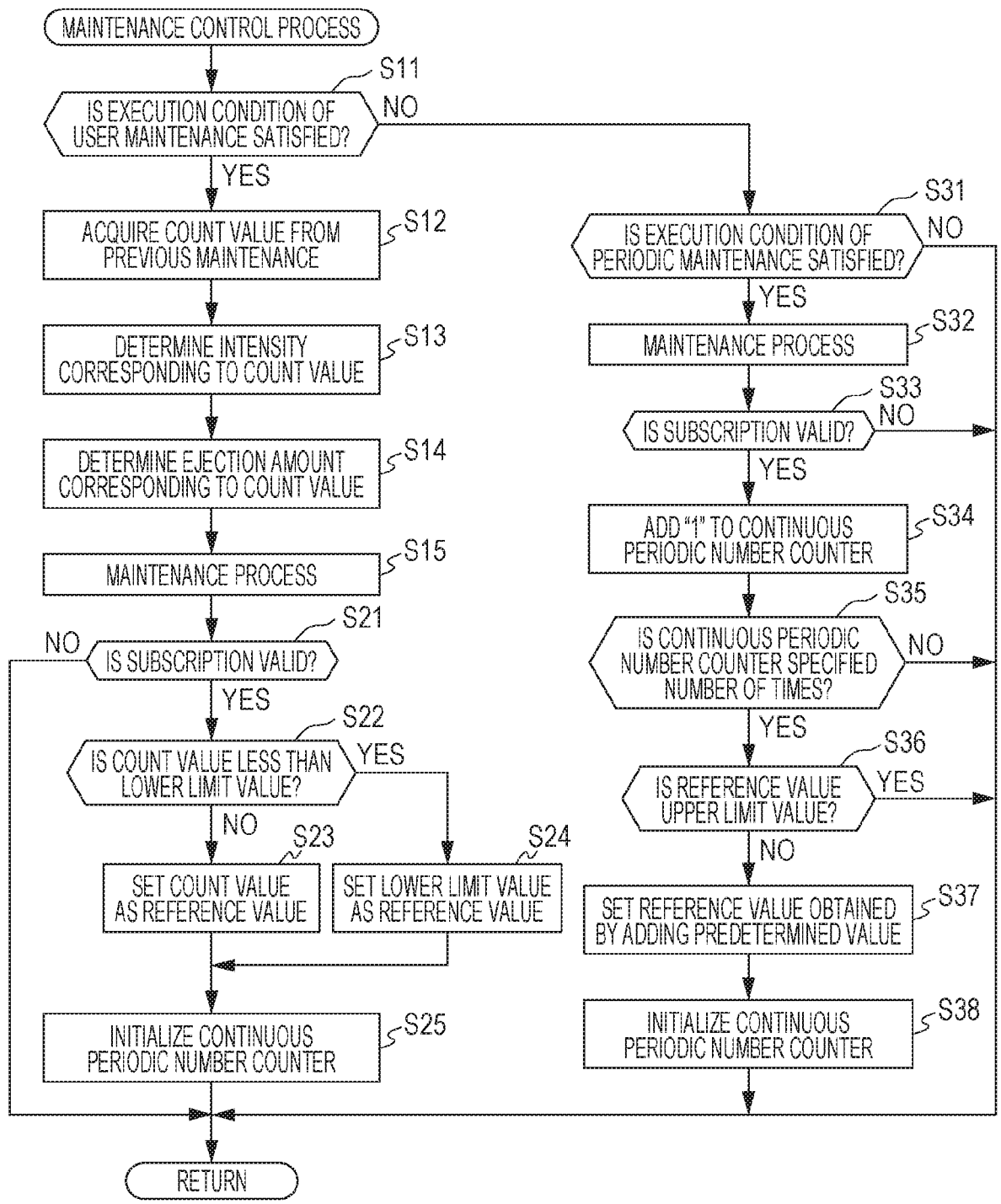
FIG. 9 is a flowchart illustrating a maintenance control process performed by a control section of a printing apparatus according to a second embodiment.

As illustrated in FIG. 9, in the printing apparatus 11, as in the first embodiment, the control section 110 executes steps S11 to S15. Then, after step S15 ends, in step S21, the control section 110 determines whether or not the subscription information is valid. The subscription information is allocated to the storage section 120 and may be set according to an operation of the user or may be set based on information from the server apparatus 200. When it is determined that the subscription information is not valid, the control section 110 ends the maintenance control process. Meanwhile, when it is determined that the subscription information is valid, the control section 110 proceeds to step S22.

In step S22, the control section 110 determines whether or not the count value is less than the lower limit value, as in step S54 of the first embodiment. Specifically, when the value of the printed-sheet number counter is less than the sheet number lower limit value or when the value of the time counter is less than the time lower limit value, the control section 110 determines that the count value is less than the lower limit value. Meanwhile, when the value of the printed-sheet number counter is the sheet number lower limit value or more, and the value of the time counter is the time lower limit value or more, the control section 110 determines that the count value is not less than the lower limit value. For the sheet number lower limit value and the time lower limit value, values corresponding to the apparatus type information are referred to.

When it is determined that the count value is not less than the lower limit value, the control section 110 determines the count value as the reference value, sets the count value as the reference value (step S23), and proceeds to step S25. Meanwhile, when it is determined that the count value is less than the lower limit value, the control section 110 determines the lower limit value as the reference value, sets the lower limit value as the reference value (step S24), and proceeds to step S25. As described above, when the count value counted from the previous maintenance to the user maintenance is the lower limit value or more, the control section 110 determines the count value counted from the previous maintenance to the user maintenance as the reference value. Meanwhile, when the count value counted from the previous maintenance to the user maintenance is less than the lower limit value, the control section 110 determines the lower limit value as the reference value. Then, the control section 110 sets the determined reference value. Accordingly, in a case where the user maintenance is performed, when the count value counted from the previous maintenance to the user maintenance is the lower limit value or more, the control section 110 sets, as the reference value, the count value counted from the previous maintenance to the user maintenance. Meanwhile, when the count value counted from the previous maintenance to the user maintenance is less than the lower limit value, the control section 110 sets the lower limit value as the reference value. Such a process is executed by the setting section 112 of the control section 110. When one of the value of the printed-sheet number counter and the value of the time counter is less than the lower limit value, and the other is the lower limit value or more, the control section 110 determines the lower limit value as the reference value corresponding to the counter in which the count value is less than the lower limit value, while determines the count value as the reference value corresponding to the counter in which the count value is the lower limit value or more.

In step S25, the control section 110 initializes the continuous periodic number counter assigned to the storage section 120, and ends the maintenance control process. The continuous periodic number counter is assigned to the storage section 120 and counts the number of times that the periodic maintenance is continuously performed. As described above, when the user maintenance is performed, the continuous periodic number counter is initialized.

In step S31, the control section 110 determines whether the execution condition of the periodic maintenance is satisfied, as in step S19 of the first embodiment. When it is determined that the execution condition of the periodic maintenance is not satisfied, the control section 110 ends the maintenance control process. Meanwhile, when it is determined that the execution condition of the periodic maintenance is satisfied, the control section 110 proceeds to step S32.

Next, in step S32, the control section 110 performs the maintenance process as in step S15 and initializes the printed-sheet number counter and the time counter. Then, in step S33, the control section 110 determines whether or not the subscription information is valid. When it is determined that the subscription information is not valid, the control section 110 ends the maintenance control process. Meanwhile, when it is determined that the subscription information is valid, the control section 110 proceeds to step S34.

In step S34, the control section 110 adds "1" to the continuous periodic number counter. Then, in step S35, the control section 110 determines whether the value of the continuous periodic number counter is a value corresponding to the specified number of times. In the present embodiment, "5" is adopted as the specified number of times, but the specified number of times may be "1" to "4", "6" or more. When it is determined that the value of the continuous periodic number counter is not a value corresponding to the specified number of times, the control section 110 ends the maintenance control process. Meanwhile, when it is determined that the value of the continuous periodic number counter is the value corresponding to the specified number of times, the control section 110 proceeds to step S36.

In step S36, the control section 110 determines whether or not the reference value is the upper limit value. Specifically, the control section 110 determines that the count value is the upper limit value when the value of the printed-sheet number counter is the sheet number upper limit value or when the value of the time counter is the time upper limit value. Meanwhile, when the value of the printed-sheet number counter is less than the sheet number upper limit value, and the value of the time counter is less than the time upper limit value, the control section 110 determines that the count value is not the upper limit value. For the sheet number upper limit value and the time upper limit value, values corresponding to the apparatus type information are referred to. When it is determined that the reference value is the upper limit value, the control section 110 ends the maintenance control process. Meanwhile, when it is determined that the reference value is not the upper limit value, the control section 110 determines the reference value to which a predetermined value is added, and sets the determined reference value (step S37). The predetermined value is a value corresponding to the apparatus type information, and is a value which does not exceed the sheet number upper limit value and the time upper limit value.

Then, in step S38, the control section 110 initializes the continuous periodic number counter assigned to the storage section 120, and ends the maintenance control process. As described above, when the periodic maintenance is performed continuously the specified number of times, the continuous periodic number counter is initialized. As described above, when the periodic maintenance is performed continuously the specified number of times, the predetermined value is added to the specified value with the upper limit value as the upper limit. Therefore, even when the user maintenance is performed and the reference value is small, the specified value is large by continuously performing the periodic maintenances the specified number of times. As described above, according to the second embodiment, the effects (1) to (4), (7), and (8) of the first embodiment can be obtained similarly.

Third Embodiment

Hereinafter, a third embodiment will be described. In the first embodiment and the second embodiment, in a case where the user maintenance is performed, the user maintenance is changed to the intensity corresponding to the count value of the counting section 113, or the preliminary ejection is increased to the ejection amount corresponding to the count value. However, instead of this, the user maintenance may be performed only when a difference between an interval from before the previous maintenance to the previous maintenance and an interval from the previous maintenance to the user maintenance is the specified value or more, which is an upper limit of a difference assumed when the ejecting section 23 is normal. For example, the specified value described above, which is the upper limit value of the difference in the interval assumed when the ejecting section 23 is normal is stored in the storage section 120. That is, when the difference in the interval is the difference in the time, the time specified value is set in association with the total use time. When the difference in the interval is the difference in the number of printed sheets, the sheet number specified value is set in association with the total use time. Further, when the difference in the interval is the difference in the number of passes, the pass number specified value is set in association with the total use time.

When the user maintenance is instructed, the control section 110 reads the total use time from a total time counter that counts the total use time of the printing apparatus 11 at that time, and reads the specified value corresponding to the total use time from the storage section 120. When the user maintenance is instructed, the control section 110 determines whether or not the difference between the count value of the counting section 113 at the time of the previous maintenance and the count value of the counting section 113 from the previous maintenance to the user maintenance is the specified value or more. When it is determined that the count value is the specified value or more, the control section 110 greatly changes the maintenance intensity at the time of the user maintenance. That is, the cleaning is performed with an intensity higher when the difference in the count value is the second value which is the specified value or more, than when the difference in the count value is the first value which is a value less than the specified value. Further, when the user maintenance is instructed, if the control section 110 determines that the difference between the count value of the counting section 113 at the time of the previous maintenance and the count value of the counting section 113 from the previous maintenance to the user maintenance is the specified value or more, the ejection amount is increased in the preliminary ejection at the time of the user maintenance and in the preliminary ejection during the printing after the user maintenance. In other words, the control section 110 increases the ejection amount in the preliminary ejection at the time of the user maintenance and the preliminary ejection during the printing after the user maintenance, more when the difference in the count value is the second value which is a value of the specified value or more, than when the difference in the count value is the first value which is a value less than the specified value. As the specified value, the time specified value for time, the sheet number specified value for the number of printed sheets, and the pass number specified value for the number of passes may be respectively set according to values of parameters counted by the counting section 113. In this case, when at least two of these three values are employed as the count value, if at least one of the differences in the respective count values is the corresponding specified value or more, it is determined that the count value is the specified value or more.

When the user maintenance is instructed, the specified value corresponding to the total use time of the printing apparatus 11 at that time is read from the storage section 120, and it is determined whether or not the difference in the count value counted by the counting section 113 is the specified value or more. For example, if the difference in the time count value is the time specified value or more, the control section 110 greatly changes the cleaning intensity at the time of the user maintenance, or increases the ejection amount of the preliminary ejection at the time of the user maintenance and the ejection amount of the preliminary ejection during the printing thereafter. Further, for example, if the difference in the sheet number count value is the sheet number specified value or more, the control section 110 greatly changes the cleaning intensity at the time of the user maintenance, or increases the ejection amount of the preliminary ejection at the time of the user maintenance and the ejection amount of the preliminary ejection during the printing thereafter. Furthermore, for example, if the difference in the pass number count value is the pass number specified value or more, the control section 110 greatly changes the cleaning intensity at the time of the user maintenance, or increases the ejection amount of the preliminary ejection at the time of the user maintenance and the ejection amount of the preliminary ejection during the printing thereafter. For example, in the flowcharts illustrated in FIGS. 7 and 8, between steps S12 and S13, when the user maintenance is instructed, the control section 110 determines whether or not the difference in the count value from the previous time is the specified value or more corresponding to the total use time at that time. Then, if the difference in the count value is the specified value or more, at least one of the process of step S13 for determining the intensity corresponding to the count value and the process of step S14 for determining the ejection amount corresponding to the count value is performed. The control for increasing the ejection amount of the preliminary ejection more when the difference in the count value is the specified value or more, than when the difference is less than the specified value, may be performed only at the time of the user maintenance, or may be performed only at the time of the preliminary ejection during the printing after the user maintenance.

According to the third embodiment, the following effects can be further obtained.

(9) The maintenance section 33 performs the cleaning for discharging the liquid from the ejecting section 23 at the intensity greater when the difference between the count value at the time of the previous maintenance and the count value counted from the previous maintenance to the user maintenance is the specified value or more, than when the difference is less than the specified value. Therefore, it is possible to suppress an increase in the frequency of the user maintenance due to insufficient cleaning intensity.

(10) The maintenance section 33 increases the ejection amount of the liquid ejected by the ejecting section 23 at the time of the preliminary ejection more when the difference between the count value at the time of the previous maintenance and the count value counted from the previous maintenance to the user maintenance is the specified value or more, than when the difference is less than the specified value. Therefore, it is possible to suppress the increase in the frequency of the user maintenance due to insufficient ejection amount of the liquid at the time of the preliminary ejection.

The embodiments described above can be changed to forms such as the following modification examples. Furthermore, one which is obtained by appropriately combining the embodiments described above and the following modification examples may be another modification example, or one which is obtained by appropriately combining the following modification examples may be further another modification example.

In the first and second embodiments, it may not change the cleaning intensity corresponding to the count value of the counting section 113 at the time of the user maintenance. In this case, as for the preliminary ejection, the ejection amount corresponding to the count value of the counting section 113 may be determined at the time of the user maintenance, and the ejection amount may be increased.

In the first to third embodiments, for example, when the user performs the user maintenance even once in a trial, the interval of the periodic maintenance is changed to be short. The cleaning may be changed with the intensity corresponding to the count value, or the preliminary ejection may be changed with the ejection amount corresponding to the count value, in which the user maintenance is continuously performed a plurality of times as a condition.

In the first to third embodiments, the reference value, which is set when the count value from the previous maintenance to the user maintenance is the lower limit value or more, is not limited to the count value. A value other than the count value, which is a value corresponding to the count value and is a value of the lower limit value or more, may be set as the reference value. For example, a value obtained by adding or subtracting a predetermined correction value to the count value, or a value obtained by multiplying the count value by a predetermined correction coefficient may be used.

In the third embodiment, for example, when the server apparatus 200 determines that the difference in the count value is the first specified value or more, the information indicating that the ink ejection amount due to the preliminary ejection is increased may be transmitted from the server apparatus 200 to the printing apparatus.

In the embodiments described above, for example, the control section 110 may count the date that has elapsed from the previous maintenance and perform the periodic maintenance when the counted date is the reference number of days. That is, the counting section 113 of the control section 110 may count any unit of time as long as it is a numerical value relating to the time elapsed from the previous maintenance. The unit of time counted by the counting section 113 may be a second unit, a minute unit, an hour unit, a day unit, or a week unit.

In the embodiments described above, for example, the control section 110 may count the ink consumption amount consumed for each color ink based on the image data included in the printing instruction, and perform the periodic maintenance when the counted ink consumption amount is a reference consumption amount. In the printing apparatus 11 of the serial recording system, the control section 110 may count the number of passes, which is the number of times of pass of one scan of the ejecting section 23, and perform the periodic maintenance when the counted number of passes is the reference number of passes. Further, for example, based on the printed image data, a value indicating the ink consumption amount for each color ink is added to the ink counter allocated to the storage section 120, and the periodic maintenance may be performed when the value of the ink counter is the reference value. That is, the counting section 113 of the control section 110 may count a numerical value relating to the ejection amount of the ink ejected by the ejecting section 23 from the previous maintenance. As described above, the count value counted by the counting section 113 is not limited to the elapsed time from the previous maintenance, the number of printed sheets from the previous maintenance, but may include one of the number of passes that is the number of times of the liquid ejecting operation of the ejecting section 23 onto the medium from the previous maintenance, and the liquid consumption amount consumed by the ejecting section 23 ejecting the liquid such as ink onto the medium from the previous maintenance. That is, the count value is not limited to the time count value counted by the time counter, the printed-sheet number count value counted by the printed-sheet number counter, but may be the number of passes counted by the pass number counter and the count value of the ink counter that counts the ink ejection amount ejected onto the medium. Then, the counting object of the counting section 113 may be one of these count values, or one obtained by combining two or more of these count values.

In the embodiments described above, for example, authentication information attached to the ink bottle for subscription and authentication information stored in an integrated circuit built in the ink cartridge for subscription are acquired by the printing apparatus 11 and transmitted to the server apparatus 200. Therefore, an authentication process with an authentication code stored in server apparatus 200 may be executed. By performing such an authentication process, it is determined whether the subscription information is valid or invalid, and a determination result may be registered in the user information database DB as the subscription information. Further, for example, the authentication process may be executed by the printing apparatus 11 by transmitting the authentication information from the server apparatus 200 to the printing apparatus 11.

In the embodiments described above, for example, when there is the subscription for an ink accommodation body of a part of colors of a plurality of colors of ink accommodation bodies and there is no subscription for the remaining ink accommodation bodies, the subscription information may be registered as invalid. In this case, the subscription information is registered as valid only when there is the subscription for the ink accommodation bodies of all the colors among the ink accommodation bodies of a plurality of colors, and the execution condition of the periodic maintenance can be changed. Therefore, it is possible to reduce the consumption amount of commercially available ink in which there is no subscription.

In the embodiments described above, for example, even when there is the subscription for an ink accommodation body of a part of colors of a plurality of colors of ink accommodation bodies and there is no subscription for the remaining ink accommodation bodies, the subscription information may be registered as valid. In this case, a lower limit value may be set smaller when there is the subscription for the ink accommodation bodies of all colors than when there is the subscription for an ink accommodation body of a part of colors.

For example, idle wiping for the purpose of removing adhering substances such as paper dust adhering to the nozzle forming surface 25b of the ejecting head 25 may be performed as the maintenance. When the count value of the printed-sheet number counter reaches the sheet number reference value, the idle wiping may be performed instead of the cleaning as the periodic maintenance.

In the embodiments described above, for example, when the user maintenance is performed, the number of times of wiping of the idle wiping may be increased according to the count value. In this case, for example, the ink ejection amount may not be increased at the time of the preliminary ejection according to the count value. If the subscription is valid, when the user maintenance is performed, at least one of the cleaning intensity and the ejection amount at the time of the preliminary ejection may be increased according to the count value at the time of instructing the user maintenance. If the subscription is invalid, both the cleaning intensity and the ejection amount at the time of the preliminary ejection may not be increased.

When the user maintenance is performed, it may not be changed to the cleaning intensity corresponding to the count value. That is, the process of step S13 in FIG. 7 may be omitted.

When the user maintenance is performed, the process of changing to the ejection amount corresponding to the count value may be omitted. That is, the process of step S14 in FIG. 7 may be omitted.

In each of the embodiments described above, for example, even when the subscription information is invalid, the execution condition of the periodic maintenance, that is, the reference value may be changed. In this case, the lower limit value may be set smaller when the subscription information is valid than when the subscription information is invalid.

In each of the embodiments described above, for example, when the preliminary ejection in which the ink is ejected and the idle wiping in which the ink is not ejected are performed as the maintenance, and when the subscription information is invalid, the number of wiping times of the idle wiping may be increased, and when the subscription information is valid, the ejection amount of the preliminary ejection ink may be increased.

In the embodiments described above, for example, when the exchange of the ink cartridge is detected according to a coupling state with the integrated circuit built in the ink cartridge, the ink ejection amount of the preliminary ejection, the cleaning intensity, the number of wiping times of the idle wiping, and the like may be increased. Thereby, the maintenance of the ejecting section 23 can be effectively performed, and the ink cartridge that has just been exchanged has a large ink accommodation amount. Therefore, there is no risk of running out of ink.

In the embodiments described above, for example, when the ink accommodation body is filled with the ink from the ink bottle, the delivery date of the ink bottle is managed in the server apparatus 200, and after the delivery date of the ink bottle, the ink ejection amount of the preliminary ejection, a suction force of suction cleaning, the number of wiping times of the idle wiping, and the like may be increased according to the information from the server apparatus 200. Further, for example, when the authentication information attached to the delivered ink bottle is performed, the ink ejection amount of the preliminary ejection, the suction force of the suction cleaning, the number of wiping times of the idle wiping, and the like may be increased. Thereby, it is possible to provide an opportunity to widely maintain the ejecting section 23.

In the embodiments described above, for example, the server apparatus 200 manages the delivery of the ink bottle and the ink cartridge, and when the number of deliveries exceeds a predetermined number of times, information may be generated, which requests delivery of the medium or the like indicating a cleaning kid such as a cleaning agent and a wiping member, a cleaning firmware, and a cleaning method.

In the embodiments described above, for example, in a case where the user maintenance is performed, when the count value is the lower limit value or more, a value obtained by multiplying the count value by a coefficient may be set as the reference value. That is, in a case where the user maintenance is performed, when the count value is the lower limit value or more, the reference value may be set based on the count value.

In the embodiments described above, for example, when the user maintenance is continuously performed the specified number of times, the reference value may be set. In this case, the specified number of times may be one or a plurality of times.

In the embodiments described above, for example, the first specified value and the second specified value may be a same specified value.

In the embodiments described above, for example, destination information (installation destination information) is stored in the server apparatus 200. The execution condition (method of determining the reference value) of the periodic maintenance may be different for each piece of the destination information, such as by multiplying the reference value by a coefficient for each destination information. Further, for example, the destination information is stored in the printing apparatus 11 itself, and the execution condition of the periodic maintenance may be different for each destination information. Further, for example, a plurality of combinations of the destination information and the reference value information are stored in the server apparatus 200, and when the printing apparatus 11 starts to be used, the destination information may be transmitted from the printing apparatus 11 to the server apparatus 200 according to an operation of the user. In this case, the server apparatus 200 acquires the reference value information based on the destination information and transmits the reference value information to the printing apparatus 11. Therefore, the printing apparatus 11 can set the reference value (initial reference value) corresponding to the destination information.

In the embodiments described above, for example, calendar information and weather trends may be stored in the server apparatus 200, and the execution condition (method of determining the reference value) of the periodic maintenance may be changed depending on the date and time (season) and the weather trends. Further, for example, the calendar information and the weather trends may be stored in the printing apparatus 11, and the execution condition of the periodic maintenance may be changed depending on the date and time (season) and the weather trends.

In the embodiments described above, for example, the printing apparatus 11 may have an environment information detection section that detects environment information including at least one of temperature and humidity, and the control section 110 may change the execution condition of the periodic maintenance based on the environment information. Of course, the environment information may be transmitted from the printing apparatus 11 to the server apparatus 200, and the server apparatus 200 may change the execution condition of the periodic maintenance based on the environment information.

In the embodiments described above, for example, the medium type information on the type of the medium to be printed by the printing apparatus 11 may be acquired, and the medium type information may be transmitted to the server apparatus 200. In this case, in the server apparatus 200, the execution condition of the periodic maintenance may be changed based on the type of the medium and the frequency of use thereof.

In the embodiments described above, for example, the printing system may include a terminal apparatus capable of communicating with at least one of the printing apparatus 11 and the server apparatus 200. In this case, part or all of the communication between the printing apparatus 11 and the server apparatus 200 may be performed via the terminal apparatus.

In the embodiments described above, the ink can be randomly selected as long as it can be printed on the medium by, for example, adhering to the medium. The ink includes, for example, those obtained by dissolving, dispersing, or mixing particles of a functional material formed of a solid material such as a pigment or metal particles in a solvent, and those containing various compositions such as an aqueous ink, an oil-based ink, a gel ink, and a hot melt ink.

In the embodiments described above, the medium may be, for example, paper, resin, metal, cloth, ceramic, rubber, a natural material (wood, stone, or the like), or a composite thereof. The medium may be a relatively thick plate, a sheet specified by a thickness of 250 µm or more, a film specified by a thickness of 250 µm or less, a metal foil, or the like. Furthermore, the shape of the medium may be any shape such as a rectangle or a circle. That is, for example, a composite film (resin-impregnated paper, resin-coated paper, or the like) of paper and resin, a composite film (laminated film) of resin and metal, a woven fabric, a nonwoven fabric, a disk, a circuit substrate, or the like may be used.

In the embodiments described above, for example, the printing apparatus may be an apparatus that prints an image of a character, a picture, a photograph, or the like by attaching the liquid such as the ink to the medium, and may include a serial printer, a lateral printer, a line printer, a page printer, or the like. Further, the printing apparatus may be an offset printing apparatus, a textile printing apparatus, or the like. Further, the printing apparatus only needs to have at least a printing function for printing on the medium, and may be a multifunction peripheral having functions other than the printing function. Furthermore, the printing apparatus is may be an apparatus that prints on not only the two-dimensional medium but also a medium having a three-dimensional curved surface.

Hereinafter, technical ideas grasped from the embodiments and the modification examples will be described together with effects.

A printing apparatus includes an ejecting section ejecting a liquid onto a medium, a maintenance section that performs maintenance of the ejecting section by discharging the liquid from the ejecting section, periodically or according to an instruction of a user, a setting section setting a reference value that satisfies an execution condition of a periodic maintenance periodically performed by the maintenance section, and a counting section counting a count value from a previous maintenance toward the reference value that specifies an interval of the periodic maintenance. The maintenance section performs the periodic maintenance when the count value counted by the counting section reaches the reference value. In a case where the user maintenance is performed by the maintenance section according to the instruction of the user, when the count value counted up to the user maintenance is a lower limit value or more, the setting section sets the reference value that is a value corresponding to the count value and is the lower limit value or more, while when the count value counted up to the user maintenance is less than the lower limit value, the setting section sets the lower limit value as the reference value.

According to this configuration, when the user maintenance is performed according to the instruction of the user, the reference value that satisfies the execution condition of the periodic maintenance can be set based on the count value counted from the previous maintenance to the user maintenance. Meanwhile, even when the count value counted from the previous maintenance to the user maintenance is less than the lower limit value and the maintenance is frequently performed according to the instruction of the user, thereafter, the reference value that satisfies the execution condition of the periodic maintenance is not less than the lower limit value, and the periodic maintenance is frequently performed. Therefore, it is possible to suppress that the liquid consumption amount excessively increases due to excessive liquid ejection by performing the frequent periodic maintenance.

In the printing apparatus described above, when the user maintenance is performed, the maintenance section may eject the liquid larger when the count value counted from the previous maintenance to the user maintenance is a second count value, which is smaller than a first count value, than when the count value is the first count value.

According to this configuration, in a case where the user maintenance is performed, it is possible to eject the liquid more when the count value counted from the previous maintenance to the user maintenance is the second count value which is smaller than the first count value, than the count value is the first count value. It is possible to suppress the increase in the frequency of the user maintenance due to insufficient ejection amount of the liquid.

In the printing apparatus described above, when the user maintenance is performed, the maintenance section may eject the liquid more when a difference between the count value at the time of the previous maintenance and the count value counted from the previous maintenance to the user maintenance is a specified value or more, than when the difference is less than the specified value.

According to this configuration, when the user maintenance is performed, it is possible to eject the liquid more when the difference between the count value at the time of the previous maintenance and the count value counted from the previous maintenance to the user maintenance by the counting section is the specified value or more, than when the difference is less than the specified value. It is possible to suppress the increase in the frequency of the user maintenance due to insufficient ejection amount of the liquid.

In the printing apparatus described above, when the user maintenance is performed, the maintenance section may increase the intensity of maintenance for discharging the liquid greater when a count value counted from the previous maintenance to the user maintenance is a second count value which is smaller than a first count value than when the count value is the first count value.

According to this configuration, it is possible to suppress the increase in the frequency of the user maintenance due to insufficient discharging amount of the liquid at the time of the user maintenance.

In the printing apparatus, when the user maintenance is performed, the maintenance section may perform maintenance for discharging the liquid from the ejecting section in an intensity greater when a difference between the count value at the time of the previous maintenance and the count value counted from the previous maintenance to the user maintenance is a specified value or more, than the difference is less than the specified value.

According to this configuration, when the user maintenance is performed, the maintenance section performs maintenance for discharging the liquid from the ejecting section in an intensity greater in a case where a difference between the count value counted at the time of the previous maintenance by the counting section and the count value counted from the previous maintenance up to the user maintenance by the counting section is a specified value or more, than when the difference is less than the specified value. It is possible to suppress the increase in the frequency of the user maintenance due to insufficient maintenance intensity.

A printing apparatus configured to communicate with a server apparatus, the printing apparatus includes: an ejecting section ejecting a liquid onto a medium, a maintenance section that performs maintenance of the ejecting section by discharging the liquid at least to the ejecting section, periodically or according to an instruction of a user, a setting section setting a reference value that satisfies an execution condition of the periodic maintenance periodically performed by the maintenance section, a counting section counting a count value from a previous maintenance toward the reference value that specifies an interval of the periodic maintenance, and an information transmission section that transmits, to the server apparatus, count information relating to the count value from the previous maintenance to the user maintenance, when a user maintenance is performed according to an instruction of the user. The maintenance section performs the periodic maintenance when the count value reaches the reference value. The setting section sets the reference value based on reference information determined by the server apparatus based on the count information.

According to this configuration, in addition to the same effects as those of the printing apparatus described above, when the user maintenance is performed, the count information relating to the count value counted from the previous maintenance to the user maintenance can be transmitted to the server apparatus, and the reference value can be set based on the reference information relating to the reference value from the server apparatus. Therefore, according to the communication with the server apparatus, it is possible to suppress that the liquid consumption amount excessively increases due to excessive liquid ejection by performing the frequent periodic maintenance.

In the printing apparatus described above, when the user maintenance is performed by the maintenance section, when a difference between the count value at the time of the previous maintenance and the count value counted from the previous maintenance to the user maintenance is a specified value or more, the information transmission section may transmit, to the server apparatus, information indicating that the difference is the specified value or more. According to this printing apparatus, the same effects as those of the printing apparatus described above can be obtained.

In the printing apparatus described above, the count value counted by the counting section may include one of an elapsed time from the previous maintenance, the number of media onto which the ejecting section ejects the liquid from the previous maintenance, the number of operation times the ejecting section ejects the liquid onto the medium from the previous maintenance, and a liquid consumption amount consumed by ejecting the liquid onto the medium by the ejecting section. According to this configuration, the periodic maintenance can be performed at appropriate timing.

A printing system comprises a printing apparatus and a server apparatus configured to communicate with the printing apparatus via a network, in which the printing apparatus includes: an ejecting section ejecting a liquid onto a medium, a maintenance section that performs maintenance of the ejecting section by discharging the liquid at least to the ejecting section, periodically or according to an instruction of a user, a setting section setting a reference value that satisfies an execution condition of a periodic maintenance periodically performed by the maintenance section, a counting section counting a count value from a previous maintenance toward the reference value that specifies an interval of the periodic maintenance, and an information transmission section that transmits, to the server apparatus, count information relating to the count value counted up to a user maintenance, when the user maintenance is performed by the maintenance section according to an instruction of the user. The maintenance section performs periodic maintenance when the count value reaches the reference value set by the setting section. The server apparatus includes: a determination section that determines the reference value that is a value corresponding to the count value and a value that is a lower limit value or more, when the count value to the user maintenance is the lower limit value or more based on count information from the printing apparatus, while determines the lower limit value as the reference value when the count value to the user maintenance is less than the lower limit value, and a reference information transmission section that transmits, to the printing apparatus, reference information relating to the reference value determined by the determination section. The setting section sets the reference value based on the reference information from the server apparatus. According to this printing apparatus, the same effects as those of the printing apparatus described above can be obtained.

In the printing system described above, when the user maintenance is performed by the maintenance section, when a difference between the count value at the time of the previous maintenance and the count value counted from the previous maintenance to the user maintenance by the counting section is a specified value or more, the information transmission section may transmit, to the server apparatus, information indicating that the difference is the specified value or more. The server apparatus may include an information generation section generating confirmation request information relating to confirmation of the printing apparatus when receiving information indicating that the difference is the specified value or more.

According to this configuration, when the user maintenance is performed, when the difference between the count value at the time of the previous maintenance and the count value counted from the previous maintenance to the user maintenance is the specified value or more, the confirmation request information relating to the confirmation of the printing apparatus is generated. Thus, the confirmation of the printing apparatus can be recognized. Accordingly, it is possible to provide the user with a suitable service such as confirmation of the state of the printing apparatus by the maintenance service provider.

In the printing system described above, when the use maintenance is performed by the maintenance section, when a difference between the count value at the time of the previous maintenance and the count value counted from the previous maintenance to the user maintenance is a specified value or more, the information transmission section may transmit, to the server apparatus, information indicating that the difference is the specified value or more. The server apparatus may include an information generation section generating exchange request information relating to exchange of the printing apparatus when receiving information indicating that the difference is the specified value or more.

According to this configuration, when the user maintenance is performed, when the difference between the count value at the time of the previous maintenance and the count value counted from the previous maintenance to the user maintenance by the counting section is the specified value or more, the exchange request information relating to the exchange of the printing apparatus is generated. Thus, the exchange of the printing apparatus can be recognized. Accordingly, for example, it is possible to provide the user with a suitable service such as the exchange of the printing apparatus confirmation of the state of the printing apparatus by the maintenance service provider.

What is claimed is:

1. A printing apparatus comprising:
an ejecting section that ejects a liquid onto a medium;
a maintenance section that performs maintenance of the ejecting section by causing the liquid to be discharged from the ejection section, periodically or according to an instruction of a user;
a setting section setting a reference value that satisfies an execution condition of a periodic maintenance periodically performed by the maintenance section; and
a counting section counting a count value from a previous maintenance toward the reference value that specifies an interval of the periodic maintenance, wherein
the maintenance section performs the periodic maintenance when the count value counted by the counting section reaches the reference value, and
when a user maintenance is performed by the maintenance section according to the instruction of the user, in a case in which the count value counted up to the user maintenance is a lower limit value or more, the setting section sets the reference value that is a value corresponding to the count value and is the lower limit value or more, and in a case in which the count value counted up to the user maintenance is less than the lower limit value, the setting section sets the lower limit value as the reference value.

2. The printing apparatus according to claim 1, wherein in a case in which the user maintenance is performed, the maintenance section ejects the liquid more when the count value counted from the previous maintenance up to the user maintenance is a second count value, which is smaller than a first count value, than when the count value is the first count value.

3. The printing apparatus according to claim 1, wherein in a case in which the user maintenance is performed, the maintenance section ejects the liquid more when a difference between the count value at a time of the previous maintenance and the count value counted from the previous maintenance up to the user maintenance is a specified value or more, than when the difference is less than the specified value.

4. The printing apparatus according to claim 1, wherein in a case in which the user maintenance is performed, the maintenance section increases an intensity of maintenance for causing the liquid to be discharged greater when the count value counted from the previous maintenance up to the user maintenance is a second count value, which is smaller than a first count value, than when the count value is the first count value.

5. The printing apparatus according to claim 1, wherein in a case in which the user maintenance is performed, the maintenance section performs maintenance for causing the liquid to be discharged from the ejecting section in an intensity greater when a difference between the count value counted at a time of the previous maintenance and the count value counted from the previous maintenance up to the user maintenance is a specified value or more, than when the difference is less than the specified value.

6. A printing apparatus configured to communicate with a server apparatus, the printing apparatus comprising:
an ejecting section that ejects a liquid onto a medium;
a maintenance section that performs maintenance of the ejecting section at least by causing the ejecting section to discharge the liquid, periodically or according to an instruction of a user;
a setting section setting a reference value that satisfies an execution condition of a periodic maintenance periodically performed by the maintenance section;
a counting section counting a count value from a previous maintenance toward the reference value that specifies an interval of the periodic maintenance; and
an information transmission section that transmits, to the server apparatus, count information relating to the count value from the previous maintenance up to a user maintenance, when the user maintenance is performed according to the instruction of the user, wherein
the maintenance section performs the periodic maintenance when the count value reaches the reference value, and
the setting section sets the reference value based on reference information determined by the server apparatus based on the count information.

7. The printing apparatus according to claim 6, wherein in a case in which the user maintenance is performed by the maintenance section, when a difference between the count value counted at a time of the previous maintenance and the count value counted from the previous maintenance up to the user maintenance is a specified value or more, the information transmission section transmits, to the server apparatus, information indicating that the difference is the specified value or more.

8. The printing apparatus according to claim 1, wherein the count value counted by the counting section includes one of an elapsed time from the previous maintenance, the number of media onto which the ejecting section ejects the liquid from the previous maintenance, the number of ejection times that the ejecting section ejects the liquid onto the medium from the previous maintenance, and a liquid consumption amount consumed by ejecting the liquid onto the medium by the ejecting section.

9. A printing system comprising:
a printing apparatus; and
a server apparatus configured to communicate with the printing apparatus via a network, wherein
the printing apparatus includes
an ejecting section that ejects a liquid onto a medium,
a maintenance section that performs maintenance of the ejecting section at least by causing the ejecting section to discharge the liquid, periodically or according to an instruction of a user,
a setting section setting a reference value that satisfies an execution condition of a periodic maintenance periodically performed by the maintenance section,
a counting section counting a count value from a previous maintenance toward the reference value that specifies an interval of the periodic maintenance, and
an information transmission section that transmits, to the server apparatus, count information relating to the count value counted up to a user maintenance, when the user maintenance is performed by the maintenance section according to the instruction of the user,
the maintenance section performs periodic maintenance when the count value reaches the reference value set by the setting section,
the server apparatus includes a determination section that determines the reference value that is a value corresponding to the count value and a value that is a lower limit value or more, when the count value up to the user maintenance based on count information from the printing apparatus is the lower limit value or more, and determines the lower limit value as the reference value when the count value up to the user maintenance is less than the lower limit value, and a reference information transmission section that transmits, to the printing apparatus, reference information relating to the reference value determined by the determination section, and the setting section sets the reference value based on the reference information from the server apparatus.

10. The printing system according to claim 9, wherein in a case in which the user maintenance is performed by the maintenance section, when a difference between the count value counted at a time of the previous maintenance and the count value counted from the previous maintenance up to the user maintenance is a specified value or more, the information transmission section transmits, to the server apparatus, information indicating that the difference is the specified value or more, and the server apparatus includes an information generation section generating confirmation request information relating to confirmation of the printing apparatus when receiving information indicating that the difference is the specified value or more.

11. The printing system according to claim 9, wherein in a case in which the user maintenance is performed by the maintenance section, when a difference between the count value counted at a time of the previous maintenance and the count value counted from the previous maintenance up to the user maintenance is a specified value or more, the information transmission section transmits, to the server apparatus, information indicating that the difference is the specified value or more, and the server apparatus includes an information generation section generating exchange request information relating to exchange of the printing apparatus when receiving information indicating that the difference is the specified value or more.

* * * * *